United States Patent
Aso

(10) Patent No.: US 12,431,812 B2
(45) Date of Patent: Sep. 30, 2025

(54) ACTIVE CLAMP FLYBACK CONVERTER HAVING CLAMP SWITCH AND CLAMP CAPACITOR AND CONTROL IC FOR CONTROLLING THE CLAMP SWITCH TO LIMIT RESONANCE CURRENT

(71) Applicant: SANKEN ELECTRIC CO., LTD., Niiza (JP)

(72) Inventor: Shinji Aso, Niiza (JP)

(73) Assignee: SANKEN ELECTRIC CO., LTD., Niiza (JP)

( * ) Notice: Subject to any disclaimer, the term of this patent is extended or adjusted under 35 U.S.C. 154(b) by 262 days.

(21) Appl. No.: 18/321,835

(22) Filed: May 23, 2023

(65) Prior Publication Data

US 2023/0402929 A1  Dec. 14, 2023

(30) Foreign Application Priority Data

Jun. 9, 2022  (JP) .................. 2022-093972

(51) Int. Cl.
*H02M 3/335* (2006.01)
*H02M 1/00* (2006.01)
(Continued)

(52) U.S. Cl.
CPC ..... *H02M 3/33571* (2021.05); *H02M 1/0009* (2021.05); *H02M 1/088* (2013.01); *H02M 3/01* (2021.05)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18;
(Continued)

(56) References Cited

U.S. PATENT DOCUMENTS 6,295,213 B1 * 9/2001 Smith ............... H02M 3/33569
363/21.01
6,639,811 B2 * 10/2003 Hosotani ............. H02M 3/3385
363/19
(Continued)

FOREIGN PATENT DOCUMENTS

EP  3726716 B1  11/2021

*Primary Examiner* — Sean Kayes
*Assistant Examiner* — Nusrat Quddus
(74) *Attorney, Agent, or Firm* — METROLEX IP LAW GROUP, PLLC; Robert L. Scott, Esq

(57) ABSTRACT

An active clamp flyback converter includes a main switch, a primary winding that is electrically connected in series with the main switch, a clamp switch that is electrically connected to a connection point between the main switch and the primary winding, a clamp capacitor that is connected in series with the clamp switch, and a controller that outputs a first ON signal to control the main switch and a second ON signal to control the clamp switch during a period when the main switch is off. The controller outputs the second ON signal during a half cycle or more of a resonance period, in which the resonance current flowing in a resonance circuit comprising the clamp capacitor and a leakage inductance generated when the clam switch is turned on is limited by an excitation current of an excitation inductance of the primary winding.

13 Claims, 22 Drawing Sheets

(51) Int. Cl.
*H02M 1/088* (2006.01)
*H02M 3/00* (2006.01)

(58) Field of Classification Search
CPC ... G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H02M 3/22; H02M 1/08; H02M 1/36; H02M 3/24; H02M 3/325; H02M 3/335; H02M 3/28; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/1584; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H05B 39/048; B23K 11/24; H04B 2215/069; Y02B 70/1491; H02J 3/46; H02J 3/38
See application file for complete search history.

(56) References Cited

U.S. PATENT DOCUMENTS

| | | | |
|---|---|---|---|
| 10,020,752 B1* | 7/2018 | Vinciarelli | H02M 3/33592 |
| 11,031,876 B1* | 6/2021 | Li | H02M 3/33569 |
| 11,165,351 B1* | 11/2021 | Yau | H02M 1/342 |
| 12,294,297 B2* | 5/2025 | Ammar | H02M 3/07 |
| 2001/0022732 A1* | 9/2001 | Yasumura | H02M 3/01 |
| | | | 363/16 |
| 2008/0225558 A1* | 9/2008 | Gordon | H02M 3/33571 |
| | | | 363/21.15 |
| 2015/0016153 A1* | 1/2015 | Orr | H02M 3/33538 |
| | | | 363/21.04 |
| 2015/0131241 A1* | 5/2015 | Sprowl | H05K 5/061 |
| | | | 361/752 |
| 2015/0171759 A1* | 6/2015 | Scarlatescu | H02M 3/33523 |
| | | | 363/21.09 |
| 2015/0249397 A1* | 9/2015 | Ogasawara | H02M 1/4266 |
| | | | 363/21.17 |
| 2016/0365801 A1* | 12/2016 | Phadke | H02M 1/34 |
| 2018/0287481 A1* | 10/2018 | Liu | H02M 3/1588 |
| 2018/0337606 A1* | 11/2018 | Ausseresse | H02M 3/33507 |
| 2023/0006560 A1* | 1/2023 | Yang | H02M 1/342 |

* cited by examiner

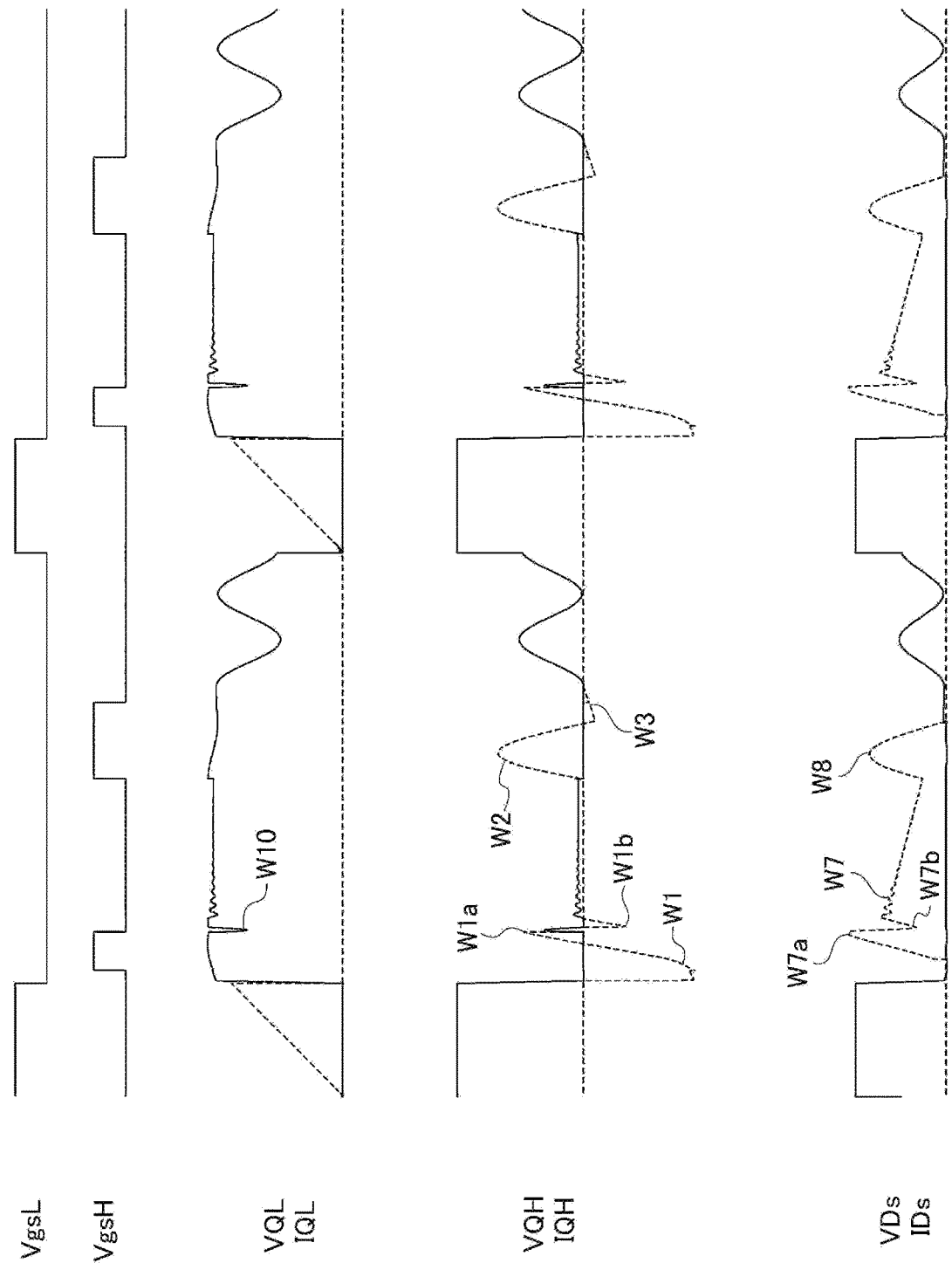

ACTIVE CLAMP FLYBACK CONVERTER HAVING CLAMP SWITCH AND CLAMP CAPACITOR AND CONTROL IC FOR CONTROLLING THE CLAMP SWITCH TO LIMIT RESONANCE CURRENT

CROSS REFERENCE TO RELATED APPLICATIONS

This application claims priority to prior Japanese Patent Application No. 2022-093972 filed with the Japan Patent Office on Jun. 9, 2022, the entire contents of which are incorporated herein by reference.

BACKGROUND

This disclosure relates to an active clamp flyback converter and a control IC (Integrated Circuit).

A typical circuit configuration of an active clamp flyback converter is described in FIG. 1 of EP3726716B1 (Patent Document. 1), where a complementary control and a non-complementary control are proposed according to a control method of an active clamp switch S2.

Regarding an operation waveform of the complementary control as illustrated in FIGS. 2A to 2D of Patent Document 1, a clamp switch S2 operates with an ON period that is set to compensate for an OFF period of a main switch S1.

After the main switch S1 is turned off, during the ON period of the clamp switch S2, a clamp capacitor C2 and a leakage inductance Ls of a transformer are in a resonance operation with a resonance period (Tcalk).

In a flyback converter, the OFF period of the main switch S1, or the ON period of the clamp switch S2 in the complementary control, becomes shorter as an output current decreases. Therefore, when the ON period of the clamp switch S2 becomes shorter than Tcalk/2, the clamp switch S2 turns off in the middle of a resonance current as illustrated in FIGS. 2A to 2D in Patent Document 1.

As a result, a secondary side current Isec turns off abruptly. There is a problem that the above-mentioned steep current change causes a high frequency oscillation due to a recovery current of a switch S3 and a parasitic inductance and a floating capacity of a wiring.

Regarding the operation waveform of the non-complementary control as illustrated in FIGS. 3A to 3E and FIG. 4 of Patent Document 1, the clamp switch S2 turns on at a point where a transformer excitation current ILm becomes zero.

The non-complementary control also results in the resonance operation with the resonance period (Tcalk) in the ON period of the clamp switch S2. In the conventional non-complementary control, the ON period of the clamp switch S2 turns off the clamp switch S2 during a period when a resonance current is flowing. In this case, the secondary side current Isec is turned off abruptly as in the complementary control. Therefore, there is a problem that the above-mentioned steep current change causes the high frequency oscillation due to the recovery current of the switch S3 and the parasitic inductance and the floating capacity of the wiring.

In Patent Document 1, a new non-complementary control is disclosed as illustrated in FIG. 6 and FIG. 7. The ON period of the clamp switch S2 is longer than a half period of the resonance period (Tcalk).

With the above-mentioned control, the secondary side current Isec does not turn off abruptly, and the high frequency oscillation caused by the recovery current of the switch S3 and the parasitic inductance and the floating capacity of the wiring may be improved.

Since the clamp switch S2 is closed after the excitation current ILm reaches zero, the excitation current flows in a negative direction during a period when the resonance current is flowing. Since only the excitation current may flow in the negative direction after the resonance current finishes flowing, a zero volt switch of the main switch S1 may be made by flowing the excitation current ILm in the negative direction more than energy to draw a charge of a capacitor C1.

However, Patent Document 1 has the following problems because the clamp switch S2 is turned on when the transformer excitation current reaches zero.

A first problem is that in the secondary side rectification current Isec, the resonance current flows after a current in a triangular waveform becomes zero. With two current waveforms, in which the current flows again after a current waveform once reaches zero, a synchronous rectification control of a secondary side becomes difficult. An effective value of the current on the secondary side also increases, which worsens loss. A second problem is that because the transformer excitation current flows in the negative direction, a magnetic flux change of the transformer increases and a core loss of the transformer increases.

SUMMARY

An active clamp flyback converter according to one or more embodiments may include: a main switch; a primary winding that is electrically connected in series with the main switch; a clamp switch that is electrically connected to a connection point between the main switch and the primary winding; a clamp capacitor that is connected in series with the clamp switch; and a controller that is electrically connected to the main switch and the clamp switch and outputs a first ON signal to control the main switch and a second ON signal to control the clamp switch during a period when the main switch is off. In one or more embodiments, the controller may output the second ON signal during a half cycle or more of a resonance period, in which the resonance current flowing in a resonance circuit comprising the clamp capacitor and a leakage inductance generated when the clam switch is turned on is limited by an excitation current of an excitation inductance of the primary winding.

A control IC comprising an active clamp flyback converter according to one or more embodiments may include: a main switch; a primary winding that is electrically connected in series with the main switch; a clamp switch that is electrically connected to a connection point between the main switch and the primary winding; a clamp capacitor that is connected in series with the clamp switch; and a controller that is electrically connected to the main switch and the clamp switch and outputs a first ON signal to control the main switch and a second ON signal to control the clamp switch during a period when the main switch is off. In one or more embodiments, the controller outputs the second ON signal during a half cycle or more of a resonance period, in which the resonance current flowing in a resonance circuit comprising the clamp capacitor and a leakage inductance generated when the clam switch is turned on is limited by an excitation current of an excitation inductance of the primary winding.

BRIEF DESCRIPTION OF DRAWINGS

FIG. 22 is an operation waveform diagram illustrating the active clamp flyback converter according to a first embodiment or embodiments when a recovery current of a body diode BDH of a clamp switch is large.

DETAILED DESCRIPTION

An active clamp flyback converter (ACF) and a control IC according to one or more embodiments are described in detail below with reference to the drawings. The same or equivalent parts of the ACF according to each embodiment may be marked with the same symbol in the figures, and the description may be omitted.

The control IC is a circuit that integrates a controller of an active clamp flyback converter. The control IC according to one or more embodiments may include a controller of an active clamp flyback converter.

First Embodiment or Embodiments

Figure 1:
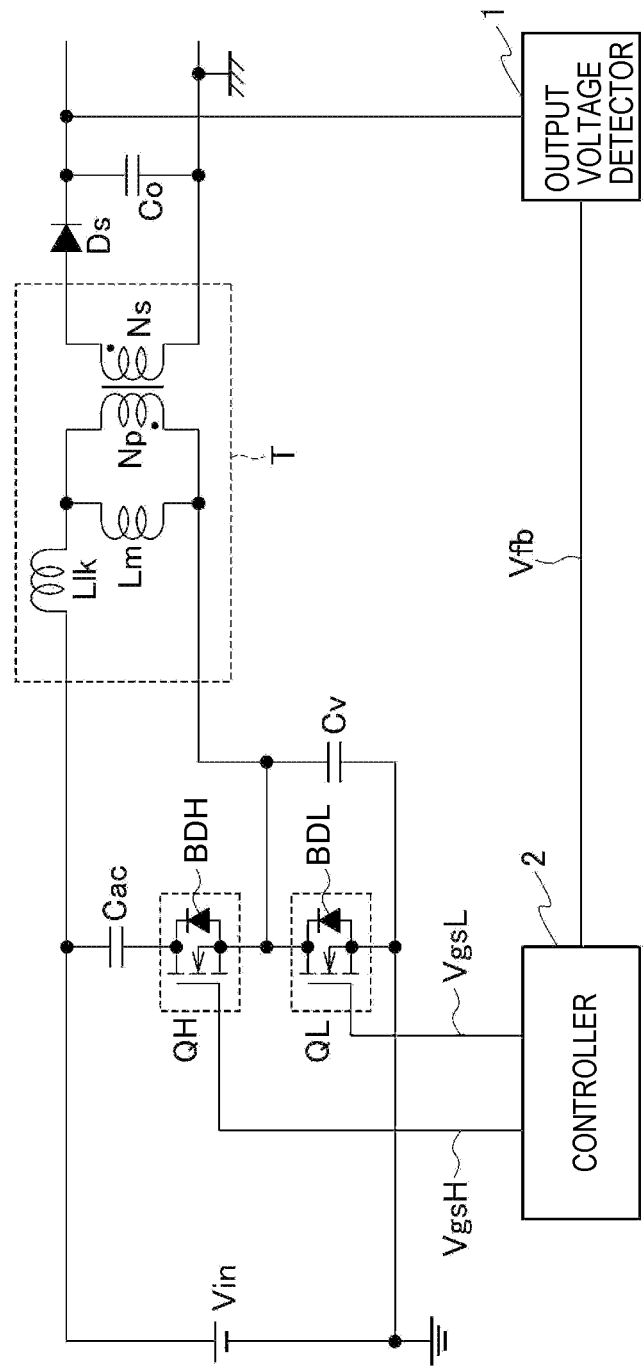
FIG. 1 is a configuration diagram illustrating an active clamp flyback converter according to a first embodiment or embodiments.

FIG. 1 is a configuration diagram illustrating an active clamp flyback converter according to a first embodiment or embodiments. The active clamp flyback converter according to a first embodiment or embodiments includes a first series circuit, in which a main switch QL and a primary winding Np of a transformer T are connected in series at both ends of a DC power supply Vin, and a second series circuit, in which a clamp switch QH and a clamp capacitor Cac are connected in series at both ends of the primary winding Np.

The main switch QL and the clamp switch QH include MOSFETs (Metal Oxide Semiconductor Field Effect Transistors), and each of the main switch QL and the clamp switch QH has a body diode BDL and a body diode BDH between a drain and a source, respectively. The MOSFET includes an output capacitance Coss between the drain and the source, which appears in a resonance operation. For convenience in explaining an operation, a voltage resonance capacitor Cv is included at both ends of the main switch QL in FIG. 1. The voltage resonance capacitor Cv may be the output capacitance Coss of the MOSFET, or a separate capacitor may be added.

The active clamp flyback converter includes a transformer T that includes a secondary winding Ns, which is electromagnetically coupled to the primary winding Np. The transformer T consists of the primary winding Np and the secondary winding Ns with a coupling coefficient less than 1 so that the primary winding Np includes an excitation inductance Lm and the primary winding Np includes a leakage inductance Llk. A third series circuit, in which a diode Ds and an output capacitor Co are connected in series, is connected to both ends of the secondary winding Ns. The diode Ds may include a rectifier.

The active clamp flyback converter includes an output voltage detector 1 that detects an output voltage of the output capacitor Co and a controller 2 that turns the main switch QL on and off based on the output voltage detected by the output voltage detector 1 and turns the clamp switch QH on and off during an OFF period of the main switch QL.

The controller 2 outputs a first ON signal VgsL to turn on and off the main switch QL and a second ON signal VgsH to turn on and off the clamp switch QH.

The second ON signal VgsH is set to an ON timing, at which a resonance current, which inverts after ½ cycle time of a resonance period of a resonance circuit including the clamp capacitor Cac and the leakage inductance Llk formed when the clamp switch QH is turned on, and flows in a direction of charging the clamp capacitor Cac, is limited by an excitation current of an excitation inductance of a primary winding. The ON period of the second ON signal may be set to ½ or more of the resonance period so that the clamp capacitor Cac is charged and discharged only once with the resonance current that discharges the clamp capacitor Cac when the clamp switch QH is turned on and a current of the reversed resonance current limited by excitation current.

The controller 2 controls the second ON signal VgsH that is set to the ON timing, at which the resonance current, which inverts after ½ cycle time of the resonance period of the resonance circuit of the clamp capacitor Cac and the leakage inductance formed when the clamp switch QH is turned on and flows in the direction of charging the clamp capacitor Cac, is limited by the excitation current of the excitation inductance of the primary winding. The resonance current discharges the clamp capacitor Cac when the clamp switch QH is turned on, and the inverted current is called an inverted resonance current. The ON period of the second ON signal is set to ½ or more of the resonance period so that the current limited by the inverted resonance current and the excitation current charges and discharges the clamp capacitor Cac only once. Therefore, the clamp switch QH turns on and off based on the second ON signal.

The controller 2 sets a time tz as a time when the excitation current ILm of the transformer T decreases to zero and the resonance period between the clamp capacitor Cac and the leakage inductance Llk as a Tcalk. The controller 2 generates a pulse, in which the turn-on time of a pulse signal of the second ON signal VgsH is after 1.22×Tcalk before the time tz, the turn-off time is before the time tz when the excitation current becomes zero, and an ON width is 0.5× Tcalk or more, to control the clamp switch QH.

More specifically, the controller 2 sets the ON timing of the second ON signal before ½ of the resonance period Tcalk to 1.22 times of the resonance period Tcalk from the time tz when the excitation current becomes zero, the OFF timing before the time tz when the excitation current becomes zero, and an ON period (ON width) of the second ON signal to be ½ or more of the resonance period between the clamp capacitor Cac and the leakage inductance Llk of the primary winding Np.

As a result, a leakage energy stored in the leakage inductance Llk during the ON period of the main switch QL is regenerated and output to the secondary side without flowing the excitation current in the negative direction by turning on the clamp switch QH.

Compared to a flyback converter added with a DCR snubber circuit, a flyback converter with a conventional active clamp circuit recovers the leakage energy stored in the leakage inductance Llk of the transformer T and flows the excitation current of the transformer T in the negative direction to achieve a zero volt switch of the main switch QL and realizes a highly efficient converter.

Therefore, the timing of a switch is set based on an assumption that the resonance current due to the resonance operation of the leakage inductance Llk and the clamp capacitor Cac and the excitation current of the transformer T flow in the negative direction when the clamp switch QH is turned on.

However, since flowing the excitation current in the negative direction increases the excitation current and a magnetic flux change of the transformer T, a copper loss and an iron loss of the transformer T increase. When the increase in the transformer T loss is larger than a reduction in switching loss due to ZVS during turn-on of the main switch QL, the excitation current is not needed to be flown in the negative direction.

Therefore, the turn-on timing of the main switch QL, as used in the conventional flyback converter, turns on the main switch QL at a minimum value of a voltage resonance between a voltage resonance capacitor Cv and an excitation inductance (Lm+Llk) of the transformer T, which occurs from the time the excitation current of the transformer T becomes zero (bottom switching control). Thus, a converter that is easier and more efficient than the conventional ACF may be configured.

The switching loss of the main switch QL may be reduced by using a switching element with a small output capacitance Coss. Therefore, when a small output capacitance Coss, such as a GaN-FET, etc., is used, bottom switching control is not necessary. However, the bottom switching control may be preferable for higher efficiency control.

Variations

Figure 2:
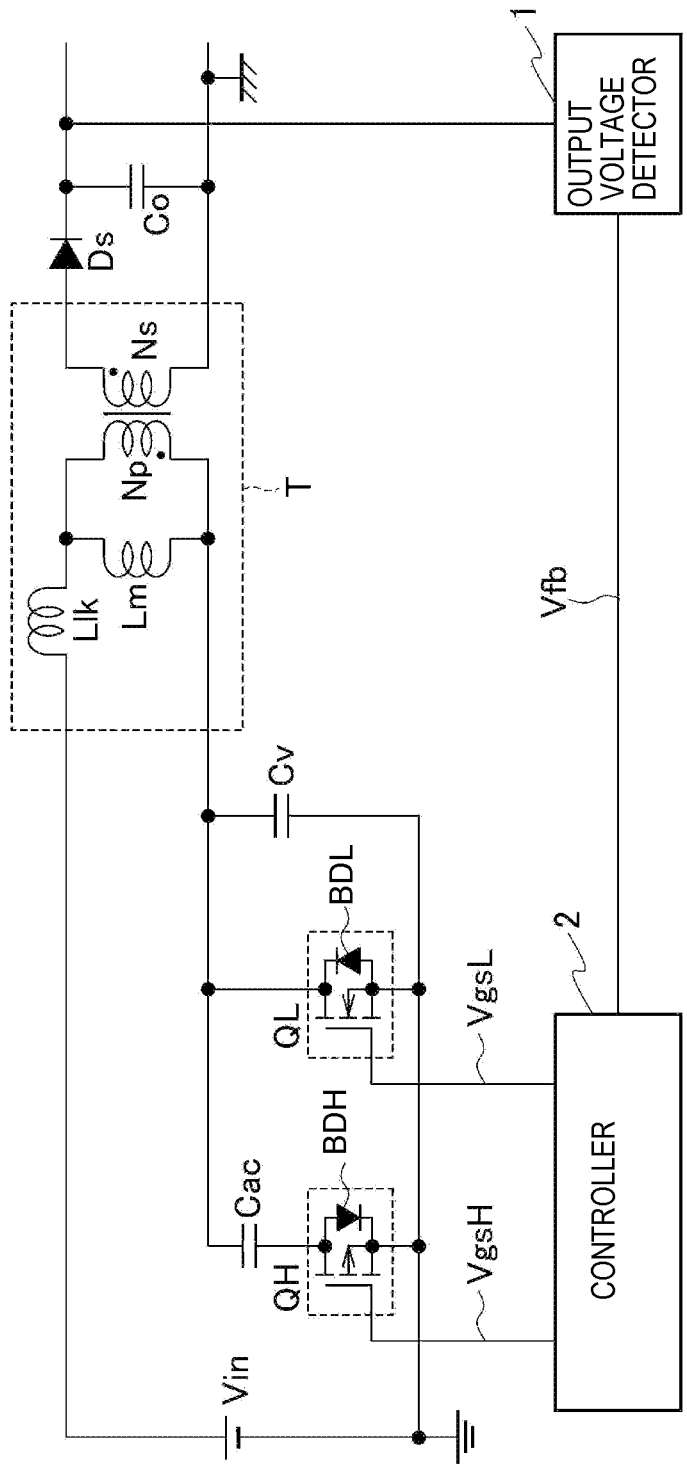
FIG. 2 is a diagram illustrating a variation of the active clamp flyback converter according to a first embodiment or embodiments.

FIG. 2 is a diagram illustrating a variation of the ACF according to a first embodiment or embodiments of FIG. 1. In FIG. 2, the clamp switch QH is a P-channel MOSFET, the source of the clamp switch QH is connected to the source of the main switch QL, the drain of the clamp switch QH is connected to one end of the clamp capacitor Cac, and the other end of the clamp capacitor Cac is connected to the drain of the main switch QL. Although a description is based on the configuration diagram illustrated in FIG. 1, the scope of application of the present invention also applies to a transformed ACF as illustrated in FIG. 2.

Figure 3:
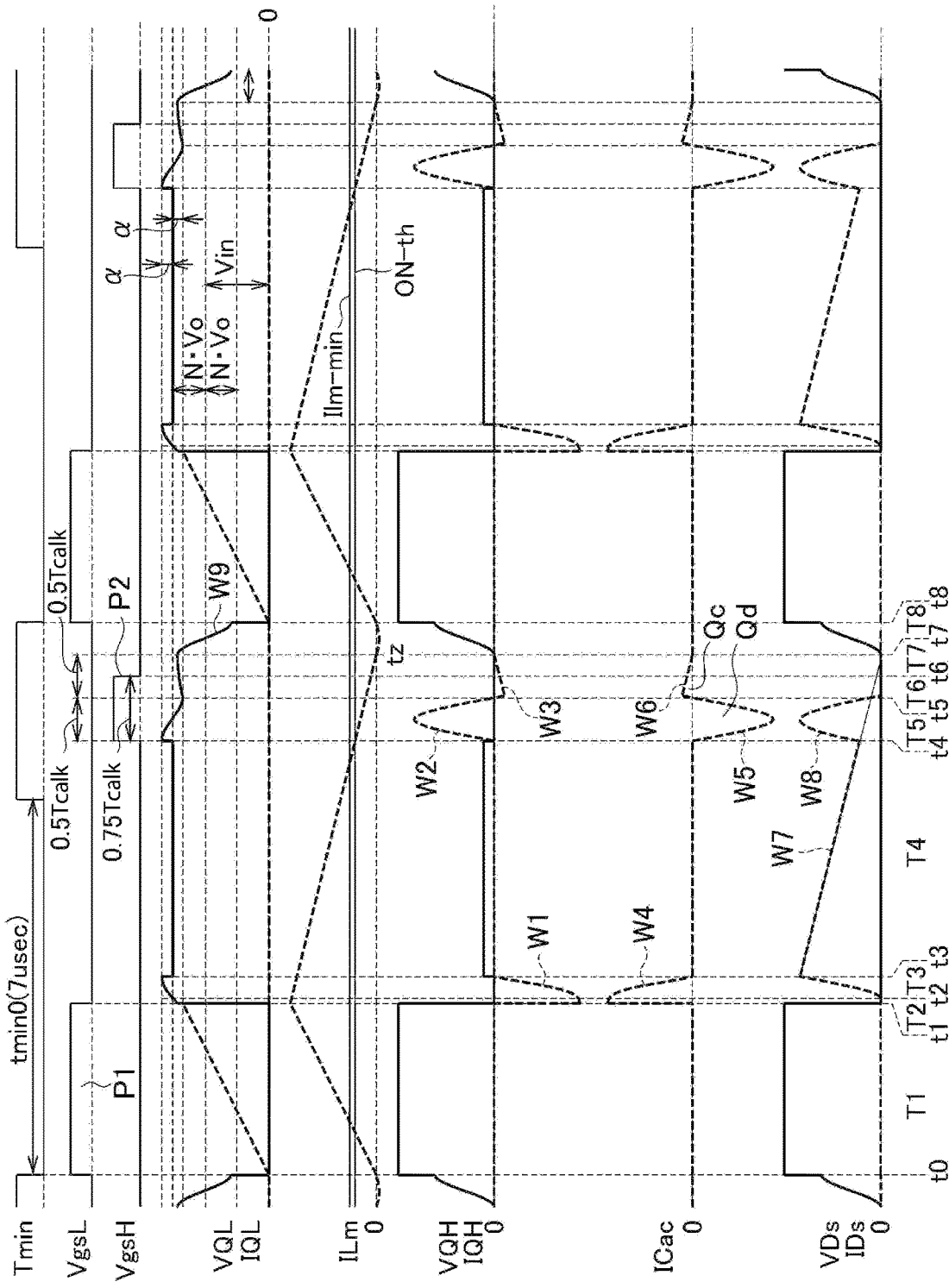
FIG. 3 is a diagram illustrating a first operation waveform of the active clamp flyback converter according to a first embodiment or embodiments.

FIG. 3 is a diagram illustrating a first operation waveform of the ACF according to a first embodiment or embodiments. In FIG. 3, Tmin is a minimum switching period. VgsL is a gate signal of the main switch QL. VgsH is a gate signal of the clamp switch QH. VQL is a voltage between the drain and the source of the main switch QL. IQL is a drain current of the main switch QL. ILm is the excitation current of the excitation inductance Lm. VQH is a voltage between the drain and the source of the clamp switch QH. IQH is the drain current of the clamp switch QH.

ICac is a current in the clamp capacitor Cac. IDs is a current in a diode Ds. The time when the excitation current ILm accumulated in the excitation inductance Lm of the transformer T during the ON period of the main switch QL decreases and becomes zero after the main switch QL is turned off is the time tz, and the resonance period between the clamp capacitor Cac and the leakage inductance Llk is Tcalk.

The time tz at which the excitation current ILm decreases to zero is a time t7, as illustrated in FIG. 3. According to one or more embodiments, a pulse P2 of VgsH generates a pulse, in which the turn-on time is after 1.22Tcalk before the time tz when the excitation current reaches zero, the turn-off time is before the time tz when the excitation current reaches zero, and the ON width is 0.5Tcalk or more.

Therefore, in FIG. 3, the ON time is set to be Tcalk before the time t7 when the excitation current ILm of the transformer T reaches zero, and the ON period is set to be 0.75Tcalk. Therefore, the OFF of the pulse P2 is set to be 0.25Tcalk before the time t7 when the excitation current ILm of the transformer T reaches zero.

A method of generating the pulse P2 is to detect the excitation current ILm and turn on the pulse P2 when the detected excitation current ILm matches a preset threshold ON-th so that the pulse P2 turns on at the above timing of Tcalk before the time t7 when the excitation current ILm of the transformer T reaches zero while the detected excitation current ILm is decreasing. Since Tcalk is determined at a converter design stage, the pulse width of the pulse P2 may be easily set by setting the pulse width before the excitation current reaches zero and 0.5Tcalk or above.

Since an absolute value of a slope during the decrease of the excitation current is proportional to an output voltage, the ON timing of the pulse P2 may be generated at the above timing of Tcalk before the time t7 when the excitation current ILm of the transformer T reaches zero even if the output voltage changes by making the threshold ON-th proportional to the output voltage.

With reference to FIGS. 4A to 4D and FIGS. 5A to 5C, operations of periods T1 to T8 of the first operation waveform illustrated in FIG. 3 is described.

Figure 4A:
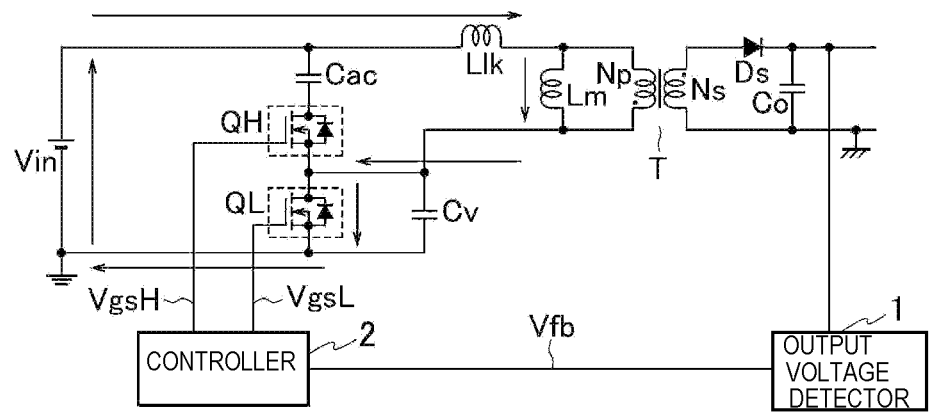
FIGS. 4A, 4B, 4C, and 4D are diagrams illustrating current paths for periods T1 to T4 of the active clamp flyback converter according to a first embodiment or embodiments.

An operation of the period T1 is described with reference to FIG. 4A. In the period T1, at a time t0, the main switch QL turns on, and the current flows in a path of a Vin positive side→Llk→Lm→QL→a Vin negative side.

The excitation current ILm flows in the excitation inductance Lm of the transformer T. The excitation current ILm increases linearly, and energy is accumulated in the excitation inductance Lm. Since the same current flows to the leakage inductance Llk as the excitation current flows to the excitation inductance Lm, the leakage energy is also accumulated in the leakage inductance Llk. At a time t1, the main switch QL turns off.

Figure 4B:
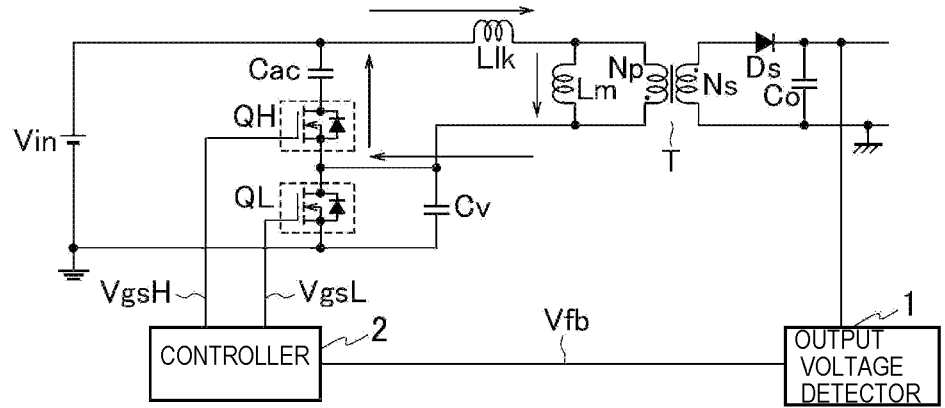

An operation of the period T2 is described with reference to FIG. 4B. In the period T2, the main switch QL is turned off at the time t1, and the leakage energy stored in the leakage inductance Llk of the transformer T may not flow to a secondary side. Therefore, the leakage energy flows in a path of Llk→Lm→QH (BDH)→Cac→Llk.

In other words, a current W1 flows through a body diode BDH of the clamp switch QH, charging the clamp capacitor Cac with a current W4. At this time, since the voltage of the clamp capacitor Cac is N·Vo or less, the energy stored in the excitation inductance Lm of the transformer T charges the clamp capacitor Cac.

Figure 4C:
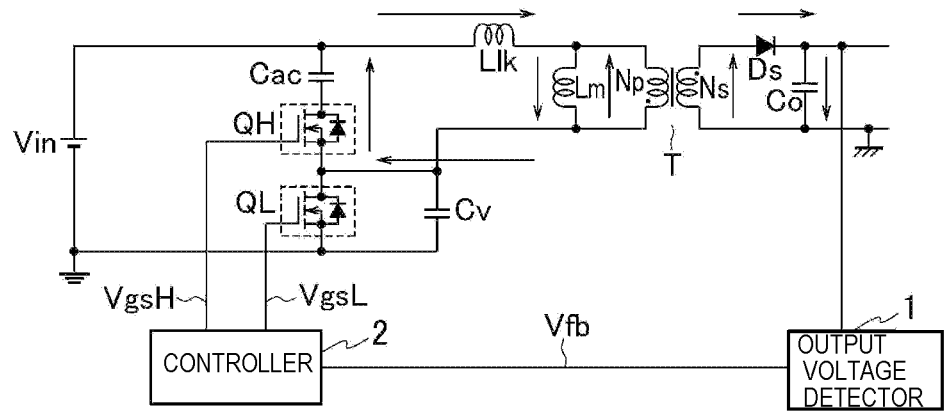

An operation of the period T3 is described with reference to FIG. 4C. A time t2 is when the voltage of the clamp capacitor Cac reaches N·Vo. In the period T3, as in the period T2, the leakage energy stored in the leakage inductance Llk flows through the path of Llk→Lm→QH (BDH)→Cac→Llk, the current W1 flows through the body diode BDH of the clamp switch QH, and the clamp capacitor Cac is charged with the current W4.

However, as the voltage of the clamp capacitor Cac becomes N·Vo at the time t2, the energy stored in the excitation inductance Lm of the transformer T begins to flow Lm→Np, and the current begins to flow from a secondary winding of the transformer T by a path of Ns→Ds→Co→Ns.

Therefore, the voltage of the excitation inductance Lm becomes N·Vo, and the current flowing in the path of Llk→Lm→QH(BDH)→Cac→Llk becomes the resonance current with Tcalk as the resonance period and becomes zero at a time t3 after 0.25Tcalk from the time t2. The leakage energy stored in the leakage inductance Llk finishes discharging. At this time, the voltage of the clamp capacitor Cac becomes higher than N·Vo by an amount of leakage energy stored in the leakage inductance Llk and becomes N·Vo+a. N is a turn ratio of Np/Ns.

Figure 4D:
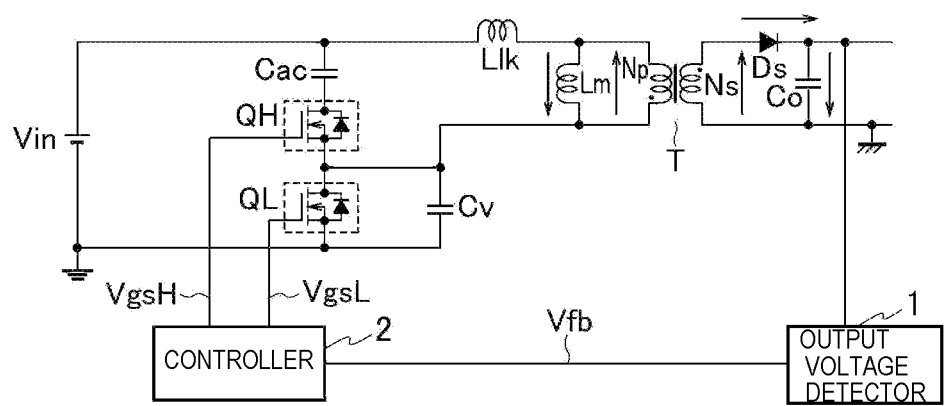

An operation of the period T4 is described with reference to FIG. 4D. The operation of the period T4 is the same operation as a normal flyback converter. The energy stored in the excitation inductance Lm flows Lm→Np→Lm and flows Ns→Ds→Co→Ns on the secondary side, and a current W7 flows in the diode current IDs.

In the period T4, the leakage energy stored in the leakage inductance Llk at the time t3 is all charged in the clamp capacitor Cac, and the voltage of the clamp capacitor Cac remains N·Vo+a in the period T4. The voltage between the primary winding Np is N·Vo when a forward voltage of the diode Ds is ignored so that the voltage at the main switch QL is Vin+N·Vo.

Figure 5A:
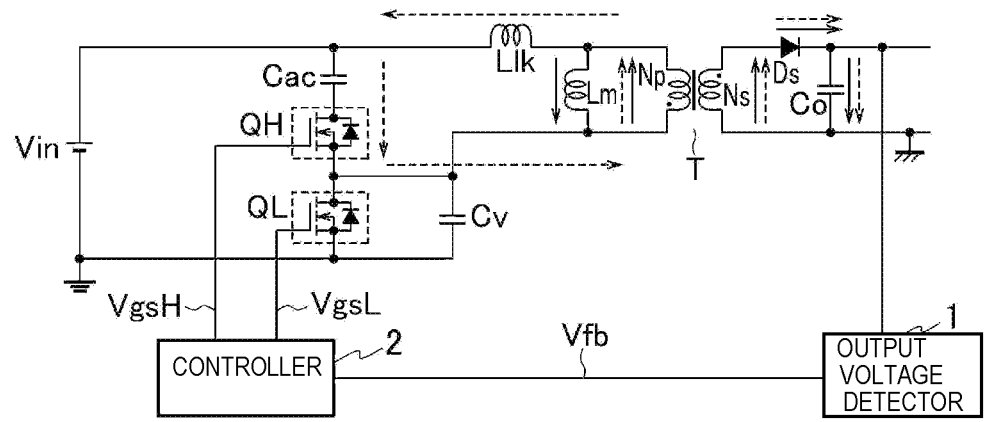
FIGS. 5A, 5B, and 5C are diagrams illustrating the current paths for periods T5 to T8 of the active clamp flyback converter according to a first embodiment or embodiments.

An operation of the period T5 is described with reference to FIG. 5A. At a time t4, the excitation current ILm discharges current to the secondary side. Therefore, a back electromotive force of the primary winding Np is N·Vo. At the time t4, the clamp switch QH is turned on. The voltage of the clamp capacitor Cac is N·Vo+a, and a potential difference of a is applied to Llk. Therefore, in the period T5, the clamp capacitor Cac and the leakage inductance Llk become a resonance operation, and a resonance current W2 flows in a path of Cac→QH→Np→Llk→Cac. In addition, the excitation current ILm of the excitation inductance Lm flows Lm→Np→Lm.

Therefore, since the excitation current ILm of the excitation inductance Lm and the resonance current flow in the same direction in Np, a current W8 in which the resonance current is superimposed on a secondary side current W7 that is a discharge current of the excitation inductance Lm flows Ns→Ds→Co→Ns on the secondary winding Ns side. At a time t5, a half of the resonance period Tcalk elapses, and the resonance current W2 becomes zero. At this time, the voltage of the clamp capacitor Cac becomes N·Vo−α due to a resonance operation.

Figure 5B:
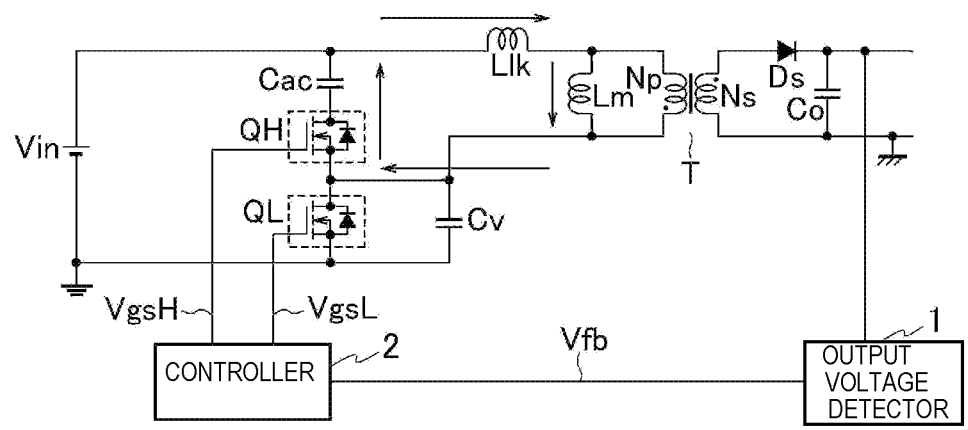

Operations of the period T6 and the period T7 are described with reference to FIG. 5B. In the period T6, the resonance current becomes from 0 to negative at the time t5, and the resonance current flows in an opposite direction of the period T4, which is Llk→Np→QH→Cac→Llk. The current in the excitation inductance Lm flows in the same direction as in the period T5, which is Lm→Np→Lm. Since the resonance current and the excitation current ILm flow in opposite directions, when the excitation current is greater than the resonance current, a current equivalent to the difference between the excitation current and the resonance current flows in the secondary side.

When the resonance current becomes equal to the excitation current, the current limited by the excitation current ILm flows in the primary side as illustrated in a waveform of the current W3, which is Llk→Lm→QH→Cac→Llk. Therefore, no current flows in the secondary side. At a time t6, the clamp switch QH turns off, but the current path does not change because the current W3 flows in a direction of conducting the body diode BDH of the clamp switch QH. In other words, the clamp switch QH may be turned off before the excitation current ILm becomes zero.

When the turn-on time of the clamp switch QH is after 1.22Tcalk before the time tz when the excitation current becomes zero, the turn-off time is before the time tz when the excitation current becomes zero, and the ON width is 0.5Tcalk or more, a charge amount Qc of a charge current W6 that charges the clamp capacitor Cac during the period T6 and the period T7 becomes ½ or less of the charge amount Qd that charges the clamp capacitor Cac during the period T5.

Therefore, the voltage of the clamp capacitor Cac at a time T7 is a voltage N·Vo−α' between N·Vo−α and N·Vo. Thus, since the voltage of the primary winding Np does not become N·Vo or more during the period T6 and the period T7, the excitation current ILm does not discharge to the secondary side, and the current in the secondary side becomes a single current waveform.

Figure 5C:
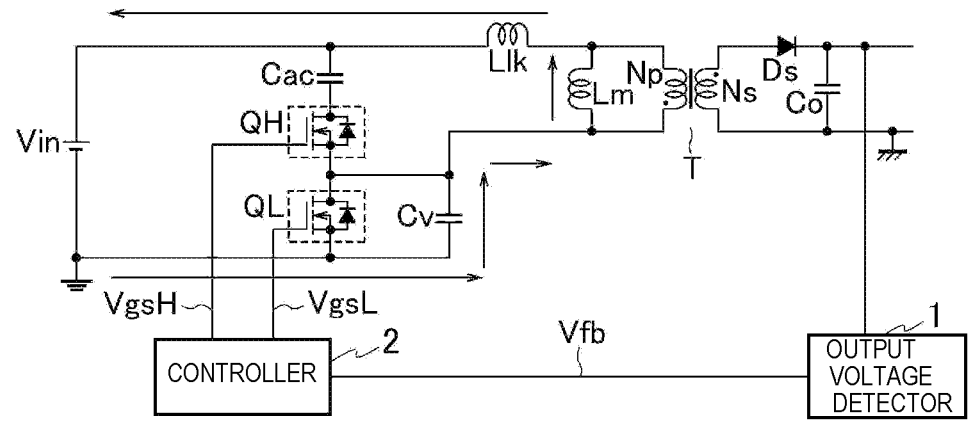

An operation of the period T8 is described with reference to FIG. 5C. At the time t7, both the main switch QL and the clamp switch QH are OFF. At the time t7, the excitation current ILm becomes zero, and the voltage of the voltage resonance capacitor Cv is Vin+N·Vo−α'; therefore, Lm+Llk between the voltage resonance capacitor Cv and the DC power Vin has a potential difference of N·Vo−a".

Therefore, a series resonance operation of the voltage resonance capacitor Cv and the inductance Lm+Llk of a transformer primary winding is made, and the current flows in the path of Cv Lm Llk Vin Cv, causing the voltage of the voltage resonance capacitor Cv to drop. When the resonance period between the voltage resonance capacitor Cv and the inductance Lm+Llk of the transformer primary winding is Tcvlm, the voltage of the voltage resonance capacitor Cv drops to Vin-N·Vo+α' at a time t8, which is Tcvlm/2 after the time t7.

Therefore, the voltage of the main switch QL becomes a voltage resonance waveform of W9. The turn-on of the main switch QL becomes a bottom switch when the main switch QL turns on again at the time t8, in which the voltage of the main switch QL is at a minimum value, after a minimum switching period tmin0, which is predetermined by Tmin, and the switching loss is at the minimum.

When the turn-on time of the clamp switch QH is after 1.22Tcalk before the time tz when the excitation current becomes zero, the turn-off time is before the time tz when the excitation current becomes zero, and the ON width is 0.5Tcalk or more, the charge amount Qc of the charge current W6 that charges the clamp capacitor Cac in the period T6 and the period T7 becomes ½ or more of a charge amount Qd that discharges the clamp capacitor in the period T5. Therefore, the voltage of the clamp capacitor Cac at the time t7 becomes the voltage N·Vo−α' between N·Vo−α and N·Vo.

Therefore, since the voltage of the primary winding Np does not become N·Vo or more during the period T6 and the period T7, the excitation current ILm does not discharge to the secondary side, and the current on the secondary side becomes a single current waveform. Thus, synchronous rectification of the secondary side may be done easily and with low loss, leakage energy stored in the leakage inductance Llk of the transformer T is regenerated and output to the secondary side, and no negative excitation current flows through the transformer T because of the clamp switch QH being turned on. Therefore, a highly efficient ACF with reduced core loss of the transformer T may be realized.

Figure 6:
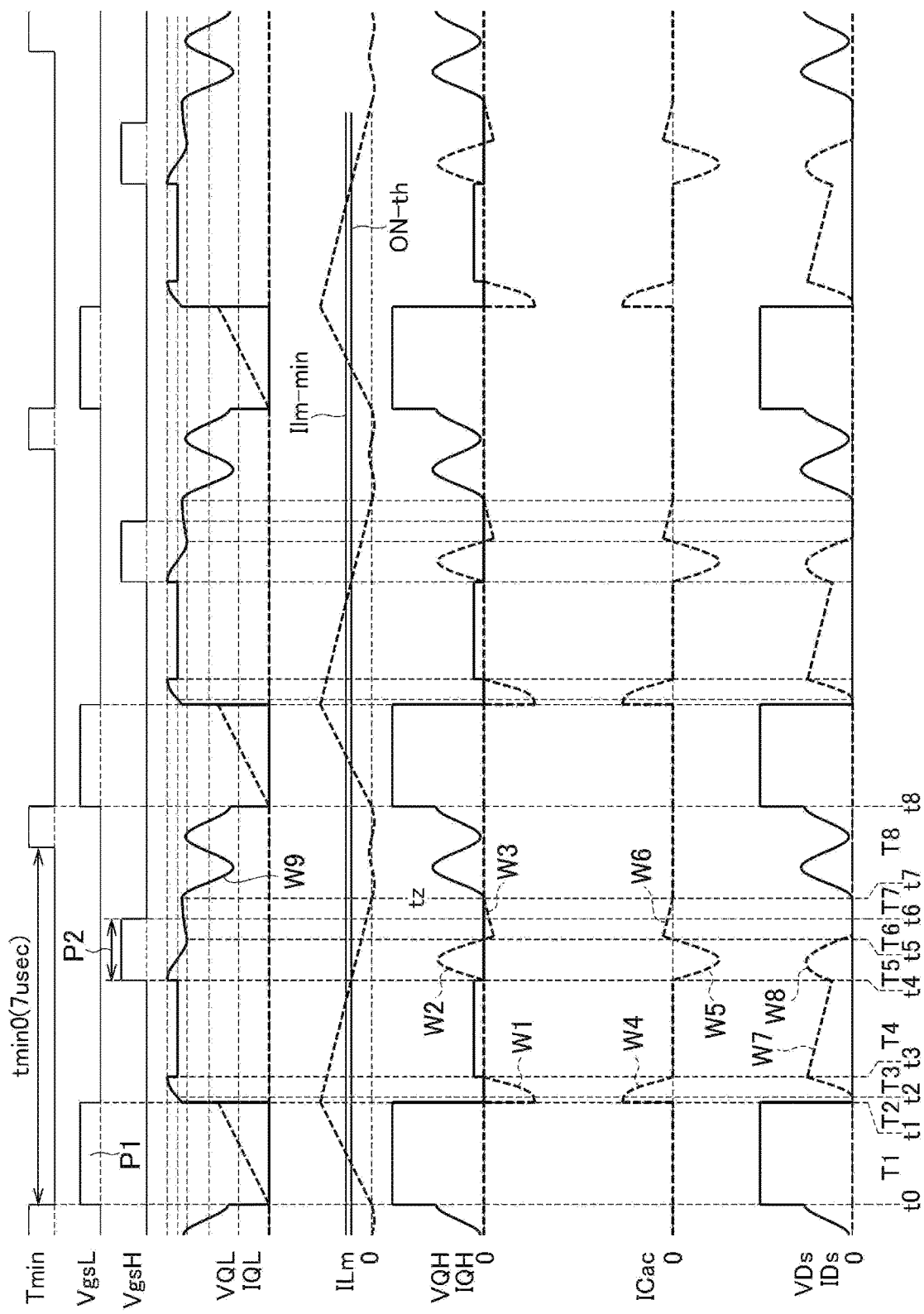
FIG. 6 is a diagram illustrating a second operation waveform of the active clamp flyback converter according to a first embodiment or embodiments.

FIG. 6 is a diagram illustrating a second operation waveform of the ACF according to a first embodiment or embodiments. Compared to the first operation waveform illustrated in FIG. 3, FIG. 6 illustrates an operation waveform when a load current becomes smaller. Since the ON time of the main switch QL becomes shorter due to the smaller load current and a wave height of the excitation current ILm also becomes smaller, the time from when the main switch QL turns off until the excitation current becomes zero becomes shorter.

However, the ON timing of the clamp switch QH is turned on and off at the same timing as described in FIG. 3. The detailed description of each period is omitted because a part of the period T8 differs from the first operation waveform illustrated in FIG. 3 and the other corresponding periods have the same operations as the descriptions of the first operation waveform illustrated in FIG. 3. Therefore, only the period T8 is described. As illustrated in FIG. 6, at the time t7, both of the main switch QL and the clamp switch QH are OFF.

When the excitation current ILm becomes zero at the time t7, the voltage of the voltage resonance capacitor Cv is Vin+N·Vo−α', so Lm+Llk between the voltage resonance capacitor Cv and the DC power Vin has a potential difference of N·Vo−α'. Therefore, the series resonance operation of the voltage resonance capacitor Cv and the inductance Lm+Llk of the primary winding Np of the transformer T is made, and the current flows in the path of Cv→Lm→Llk→Vin→Cv, causing the voltage of the voltage resonance capacitor Cv to drop.

When the resonance period between the voltage resonance capacitor Cv and the inductance Lm+Llk of the primary winding Np of the transformer T is Tcvlm, the voltage of the voltage resonance capacitor Cv drops to Vin−N·Vo+α' at the time Tcvlm/2 after the time t5.

In FIG. 6, a signal of Tmin is "L" because a first minimum voltage of the main switch QL does not pass from t0 to tmin0. Therefore, the main switch QL does not turn on at the first minimum voltage. Therefore, since the main switch QL and the clamp switch QH remain OFF, the resonance operation continues, and the voltage VQL of the main switch QL becomes a voltage resonance waveform as illustrated in W9. At the time t8, which is 1.5×Tcvlm after the time t7, the voltage VQL of the main switch QL again reaches the minimum voltage. At this time, Tmin is "H" because of passing tmin0, a gate signal Vgsl of the main switch QL becomes "H", and the main switch QL turns on at the time t8.

Figure 7:
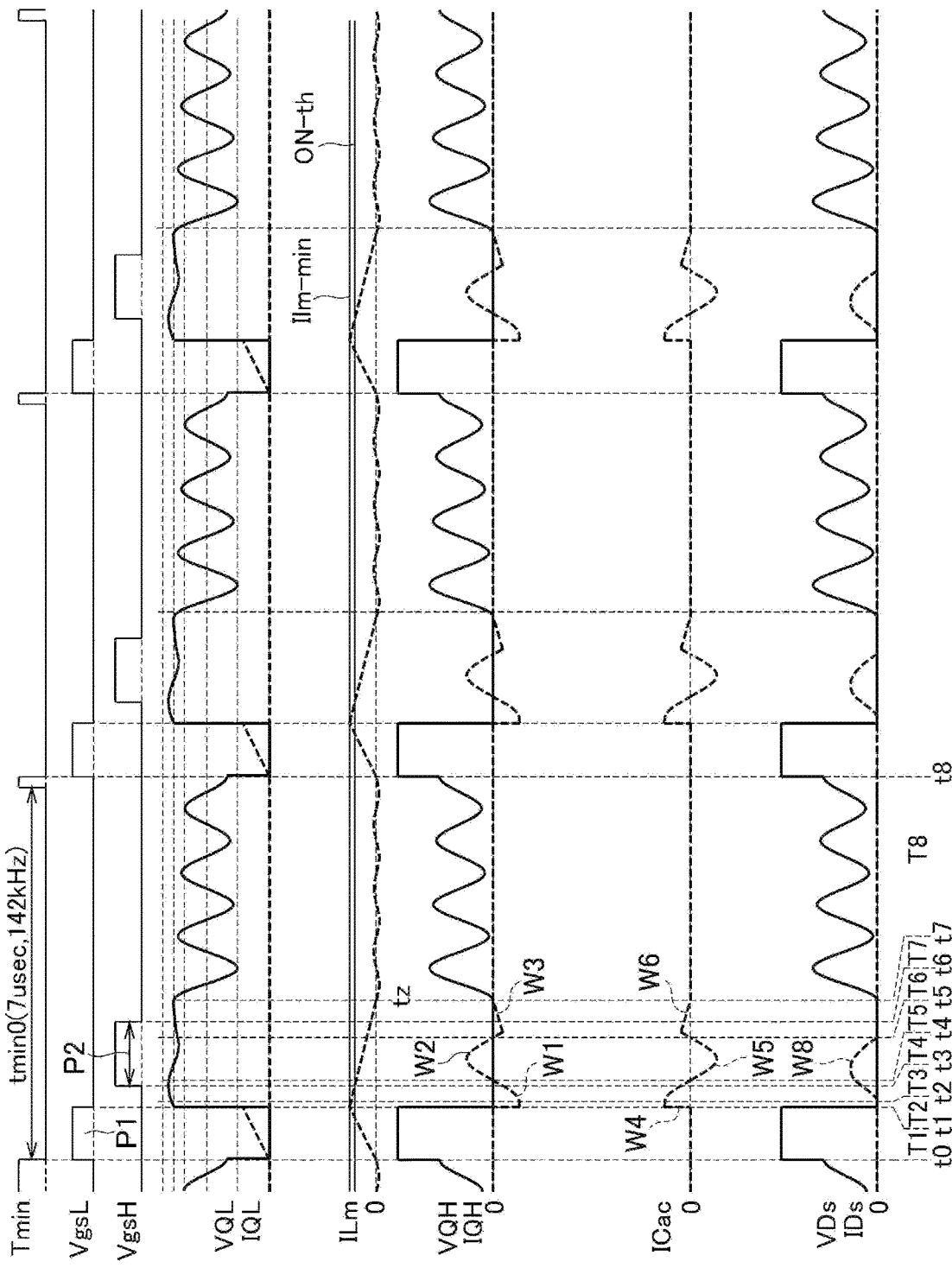
FIG. 7 is a diagram illustrating a third operation waveform of the active clamp flyback converter according to a first embodiment or embodiments.

FIG. 7 is a diagram illustrating a third operation waveform of the ACF according to a first embodiment or embodiments. FIG. 7 illustrates an operation waveform when the load current is further reduced from the second operation waveform illustrated in FIG. 6. The ON time of the main switch QL becomes even shorter, the wave height of the excitation current ILm becomes even smaller, and the time between the main switch QL turning off and the excitation current becoming zero becomes even shorter.

The ON timing of the clamp switch QH turns on and off at the same timing as described in FIG. 3, but the clamp switch QH turns on during the period T3 when the leakage energy stored in the leakage inductance Llk is transferred to the clamp capacitor Cac.

The period T3 and the period T4 are different between FIG. 7 and FIG. 6 and the other corresponding periods have the same operations as those of the second operation waveform illustrated in FIG. 6. Therefore, description of each period is omitted, and only periods of the period T3 and the period T4 are described.

In the operation waveform of FIG. 7, a period during which the leakage energy stored in the leakage inductance Llk flows through the body diode BDH of the clamp switch QH to the clamp capacitor Cac is the period T3, and the ON timing of the clamp switch QH is the time t3.

In FIG. 3, FIG. 6, and FIG. 7, the ON time of the clamp switch QH is set to be Tcalk before the time t7 when the excitation current ILm of the transformer T reaches zero, and the ON period is set to be 0.75Tcalk; therefore, the OFF of the pulse P2 is set to be 0.25Tcalk before the time t7 when the excitation current ILm of the transformer T becomes zero. The OFF time of the clamp switch may be 0.5Tcalk after the time t4 when the resonance current starts to flow and during the period T6 and the period T7 until the excitation current becomes zero. Therefore, even if the ON time is earlier than 0.25Tcalk before the time t4 when the resonance current starts to flow, the operation waveform remains the same.

In FIG. 7, the turn-on time of the clamp switch QH is set to be after 1.22Tcalk before the time tz when the excitation current becomes zero, the turn-off time is before the time tz when the excitation current becomes zero, and the ON width is 0.5Tcalk or more. In this way, the charge amount Qc of the charge current W6 that charges the clamp capacitor Cac flowing in the period T6 and the period T7 is ½ or less of the charge amount Qd that discharges the clamp capacitor flowing in the period T5. Therefore, the voltage of the clamp capacitor at the time t7 is the voltage N·Vo−α' between N·Vo−α and N·Vo−α'.

The voltage of the primary winding Np does not exceed N·Vo during the period T6 and the period T7. Therefore, the excitation current ILm does not discharge to the secondary side, the current on the secondary side becomes one current waveform, and synchronous rectification of the secondary side becomes easy and low loss. Also, the leakage energy stored in the leakage inductance Llk of the transformer T is regenerated and output to the secondary side, and no negative excitation current flows in the transformer T because of the clamp switch QH being turned on, so that a highly efficient ACF with reduced core loss in the transformer T may be realized.

The charge amount Qc of the charge current W6 that charges the clamp capacitor Cac flowing in the period T6 and the period T7 is ½ or less of the charge amount Qd that discharges the clamp capacitor flowing in the period T5 by setting the turn-on time of the clamp switch QH to after 1.22Tcalk before the time tz when the excitation current becomes zero is described. When the charge amount Qc is ½ of the charge amount Qd, the voltage of the clamp capacitor Cac at the time t7 is N·Vo. Therefore, the period T2 disappears in FIG. 3, FIG. 6, FIG. 7, and FIG. 8.

Figure 8:
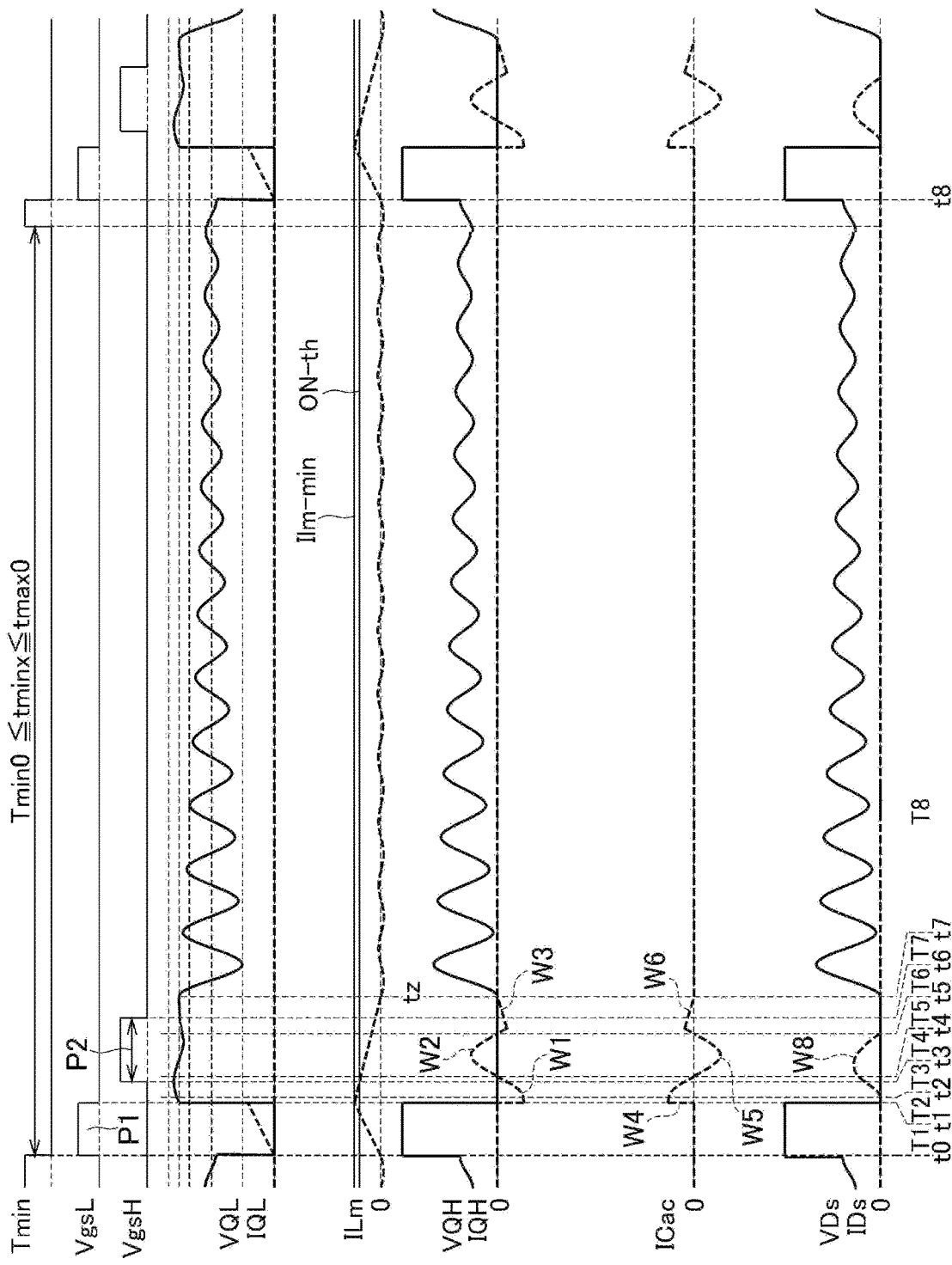
FIG. 8 is a diagram illustrating a fourth operation waveform of the active clamp flyback converter according to a first embodiment or embodiments.

Since the wave height of the resonance current is equal to the excitation current ILm when the main switch QL is turned off, when the clamp switch QH is set within the range according to one or more embodiments, the charge amount Qd and the charge amount Qc are larger at the operation waveforms of FIG. 7 and FIG. 8. Therefore, by setting the ON timing of the clamp switch QH, in which the charge amount Qc is ½ of the charge amount Qd, in the operation waveforms of FIG. 7 and FIG. 8, the charge amount Qc becomes ½ of the charge amount Qd in all operation waveforms of FIG. 3, FIG. 6, FIG. 7 and FIG. 8.

FIG. 8 is a diagram illustrating a fourth operation waveform of the ACF according to a first embodiment or embodiments. FIG. 8 illustrates an operation waveform when the load current is further reduced from the third operation waveform illustrated in FIG. 7. The ON timing of the clamp switch QH is set Tcalk before the excitation current reaches zero, so a period of decreasing excitation current ILm is necessary at least during a period when the clamp switch QH is ON.

Under a condition, in which a minimum ON width of the main switch QL is set and the ON width of the main switch QL is the minimum ON width or less, the period of a minimum switching period Tmin is increased, and the period T8 is lengthened to reduce an ON duty of the main switch QL, thereby controlling the output voltage.

The ON time of the clamp switch QH may be set from the time t5, in which the OFF time of the clamp switch QH is 0.5Tcalk after the time t4 when the resonance current begins to discharge, to the time t7 when the excitation current is zero, even though the leakage energy is transferred to the clamp capacitor Cac for the period T3. The operation waveform does not change even if the ON time is earlier than 0.25Tcalk before the time t4 when the resonance current begins to flow.

Therefore, the method of generating the pulse P2 is to detect the excitation current ILm and turn on the pulse P2 when the detected excitation current ILm matches the preset threshold ON-th so that the pulse P2 turns on at the above timing of Tcalk before the time t7 when the excitation current ILm of the transformer T reaches zero while the excitation current ILm decreases. The pulse width may be before the excitation current reaches zero and 0.5Tcalk or more since the pulse width is determined at a stage when Tcalk designs the converter.

The minimum ON width of the main switch QL may be limited by the ON width until reaching a detection ILm-min greater than the threshold ON-th, so that a dead time from the OFF of a pulse P1 to 0.25Tcalk may be taken.

Figure 9:
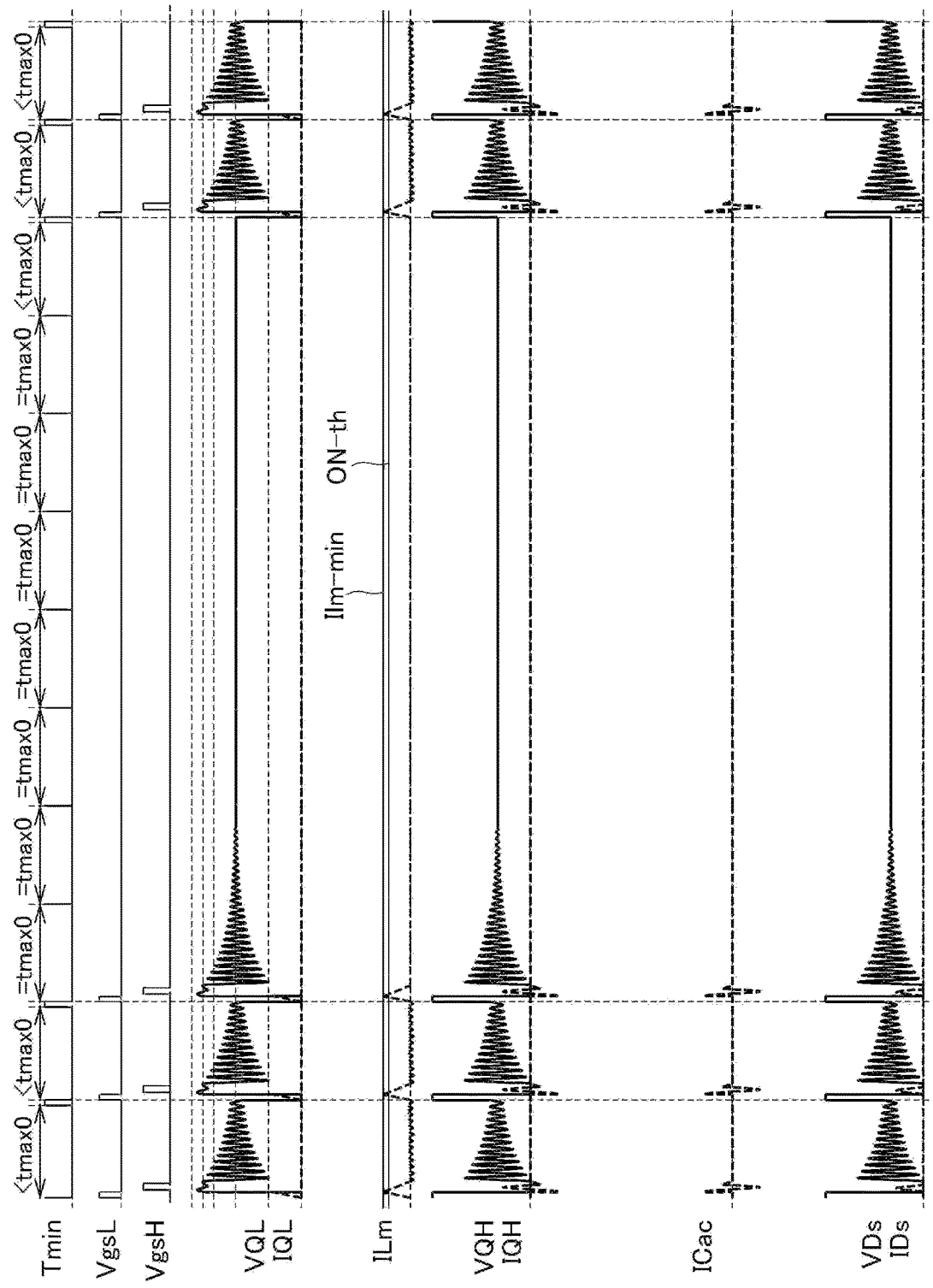
FIG. 9 is a diagram illustrating a fifth operation waveform of the active clamp flyback converter according to a first embodiment or embodiments.

FIG. 9 is a diagram illustrating a fifth operation waveform of the ACF according to a first embodiment or embodiments. FIG. 9 illustrates an operation waveform when the load current is further reduced from the fourth operation waveform illustrated in FIG. 8, which is almost no-load state. When the minimum switching period Tmin reaches a predetermined period Tmax0, the output of the pulse P1 and the pulse P2 that drive the main switch QL and the clamp switch QH is stopped, so-called burst control.

As described above, in all the operation modes in FIG. 3 and FIGS. 6 to 8, when the turn-on time of the clamp switch QH is after 1.22Tcalk before the time tz when the excitation current becomes zero, the turn-off time is before the time tz when the excitation current becomes zero, and the ON width is 0.5Tcalk or more, the charge amount Qc of the charge current W6 that charges the clamp capacitor Cac flowing during the period T6 and the period T7 is ½ or less of the charge amount Qd that discharges the clamp capacitor during the period 5.

As a result, the voltage of the clamp capacitor at the time T7 is the voltage N·Vo−α' between N·Vo−α' and N·Vo. Since the voltage of the primary winding Np does not become N·Vo or more during the period T6 and the period T7, the excitation current ILm does not discharge to the secondary side, and the current on the secondary side becomes a single current waveform. Therefore, synchronous rectification of the secondary side may be done easily and with low loss, leakage energy stored in the leakage inductance Llk of the transformer T is regenerated and output to the secondary side, and no negative excitation current flows to the transformer T because of the clamp switch QH being turned on. Therefore, a highly efficient ACF with reduced core loss of the transformer T may be realized.

Figure 10:
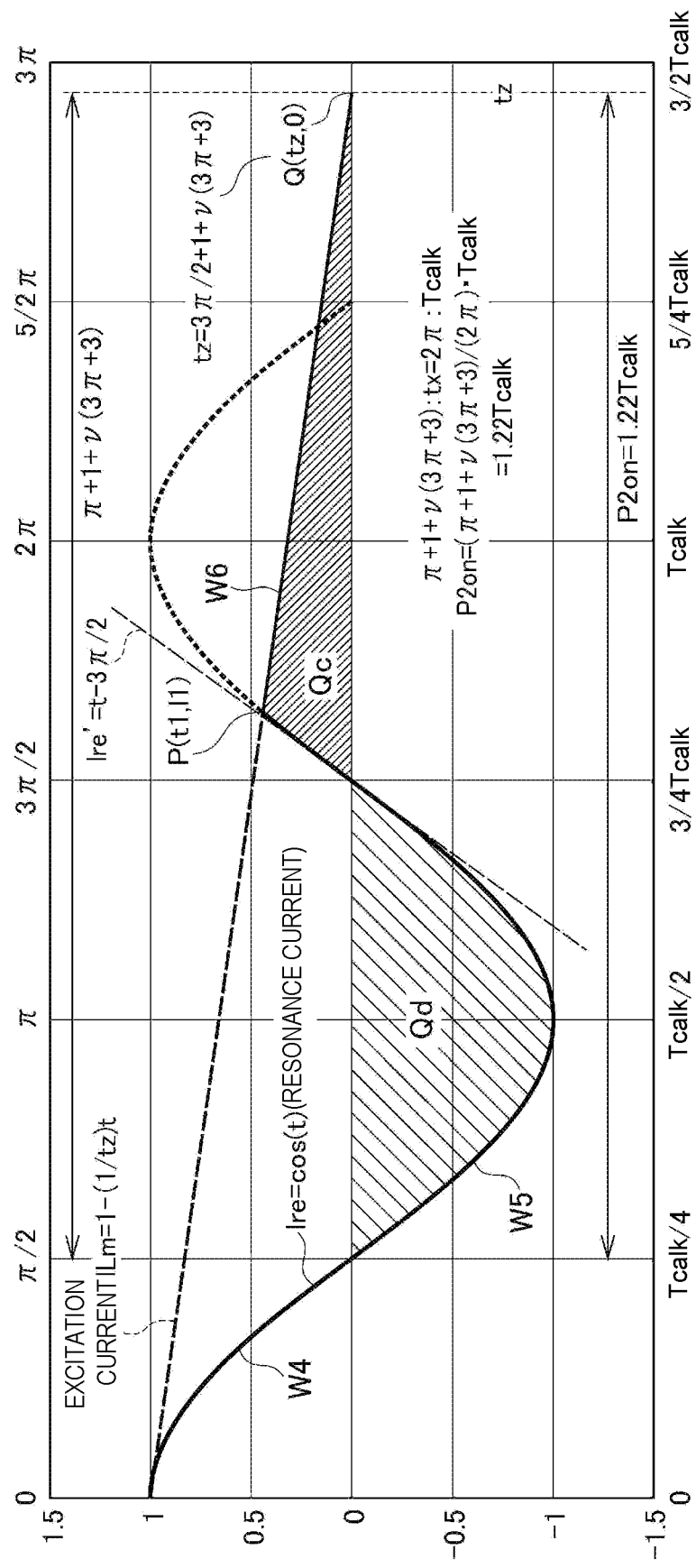
FIG. 10 is an explanatory diagram illustrating an ON timing of a clamp switch.

FIG. 10 illustrates a waveform where the charge amount Qd that discharges a clamp capacitor Cac and the charge amount Qc of the resonance current that is limited by the excitation current charging a clamp capacitor Cac are 2:1 during the ON period of the clamp switch QH. A vertical axis is l, and a horizontal axis is t in FIG. 10.

The time when the main switch QL turns off is t=0, the time when the excitation current ILm becomes zero is the time tz, and a resonance current Ire between the leakage inductance Llk and the clamp capacitor Cac and the excitation current ILm are illustrated. For ease of explanation, since the current flowing before the main switch QL is turned off is equal to the wave height of the resonance current, the vertical axis is normalized, and the horizontal time axis is also normalized with Tcalk=2π.

Therefore, the resonance current ILm may be expressed as $\cos(t)$, and the excitation current ILm as $1-(1/tz)t$. A period of $0 \leq t \leq \pi/2$ is a period when the leakage energy stored in the leakage inductance charges the clamp capacitor Cac through the body diode of the clamp switch QH. At a time $\pi/2$, the clamp switch QH turns on, and $\pi/2 \leq t \leq 3\pi/2$ is a period when the leakage energy transferred to the clamp capacitor Cac changes a direction of the current due to the resonance operation and discharges the clamp capacitor Cac. $3\pi/2 \leq t \leq tz$ is a period when the resonance current reverses again and then the current limited by the excitation current ILm charges the clamp capacitor Cac again.

In a range of $\pi/2 \leq t \leq 3\pi/2$, an area Qd of the resonance current $\cos(t)$ is 2. In a range of $3\pi/2 \leq t \leq tz$, an area Qc bounded by the resonance current $\cos(t)$, the excitation current ILm(t), and I=0 is slightly smaller than an approximate formula for the resonance current Ire, Ire'=t−3π/2, and ILm(t), and I=0.

The time tz at which the latter area becomes 1 is 3π/2+1+√(3π+3). Therefore, when the turn-on time of an active clamp switch QH is π+1+√(3π+3), i.e. after tz−1.22Tcalk, the charge amount of charging of the clamp capacitor Cac is ½ or less of the charge amount of discharging.

In a discharge direction, the clamp switch QH needs to be turned on. However, since the current flows through the body diode of the clamp switch QH during the period of current flow in the charge direction, the ON width of the clamp switch QH may be ½ or more, and the OFF timing may be before the time tz. Therefore, the clamp switch QH may have the turn-on time after 1.22Tcalk before the time tz when the excitation current becomes zero, the turn-off time before the time tz when the excitation current becomes zero, and the ON time width of 0.5Tcalk or more.

Specific Example of a First Embodiment or Embodiments

Figure 11:
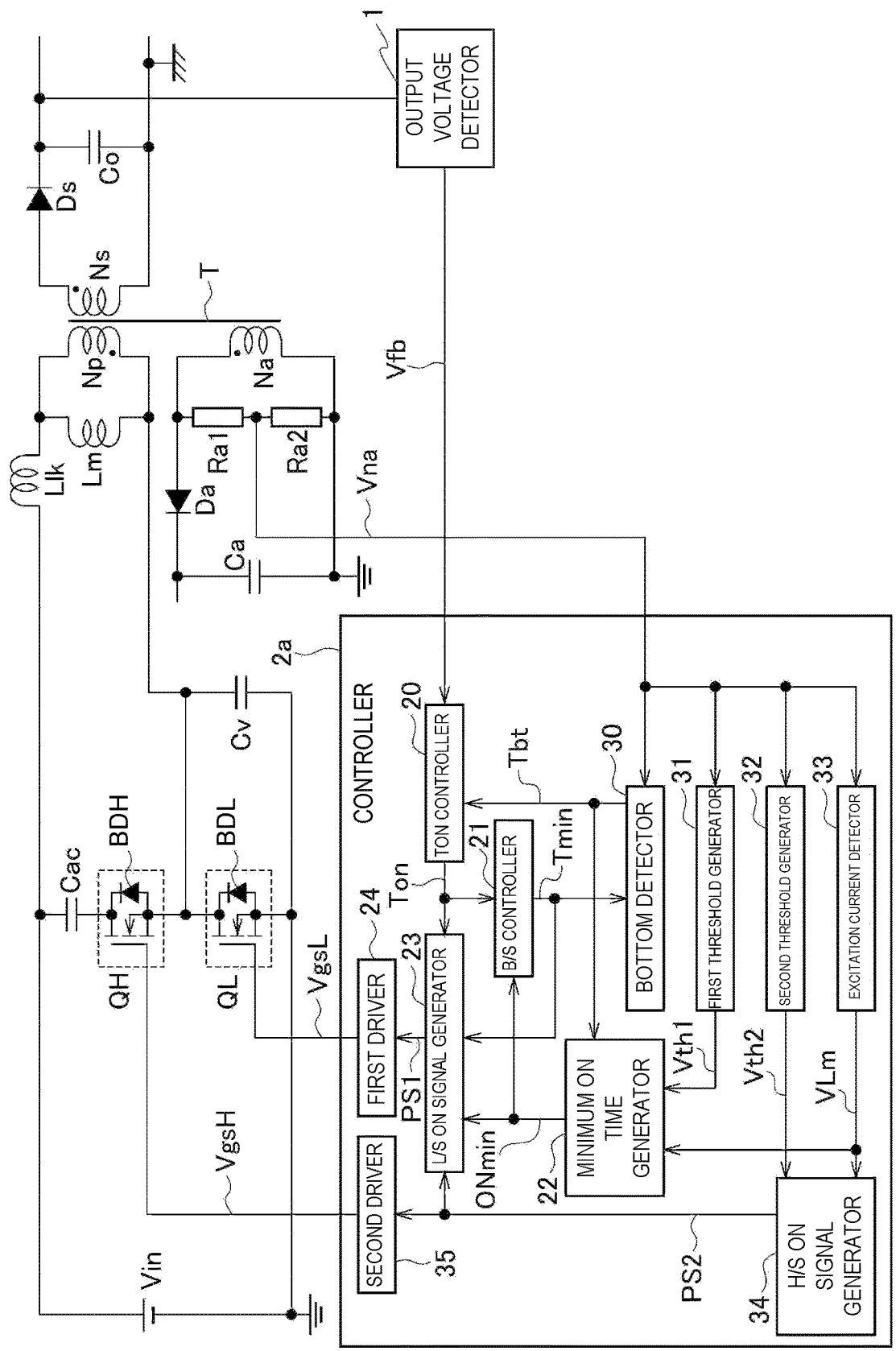
FIG. 11 is a diagram illustrating a specific example of the active clamp flyback converter according to a first embodiment or embodiments.
Figure 12:
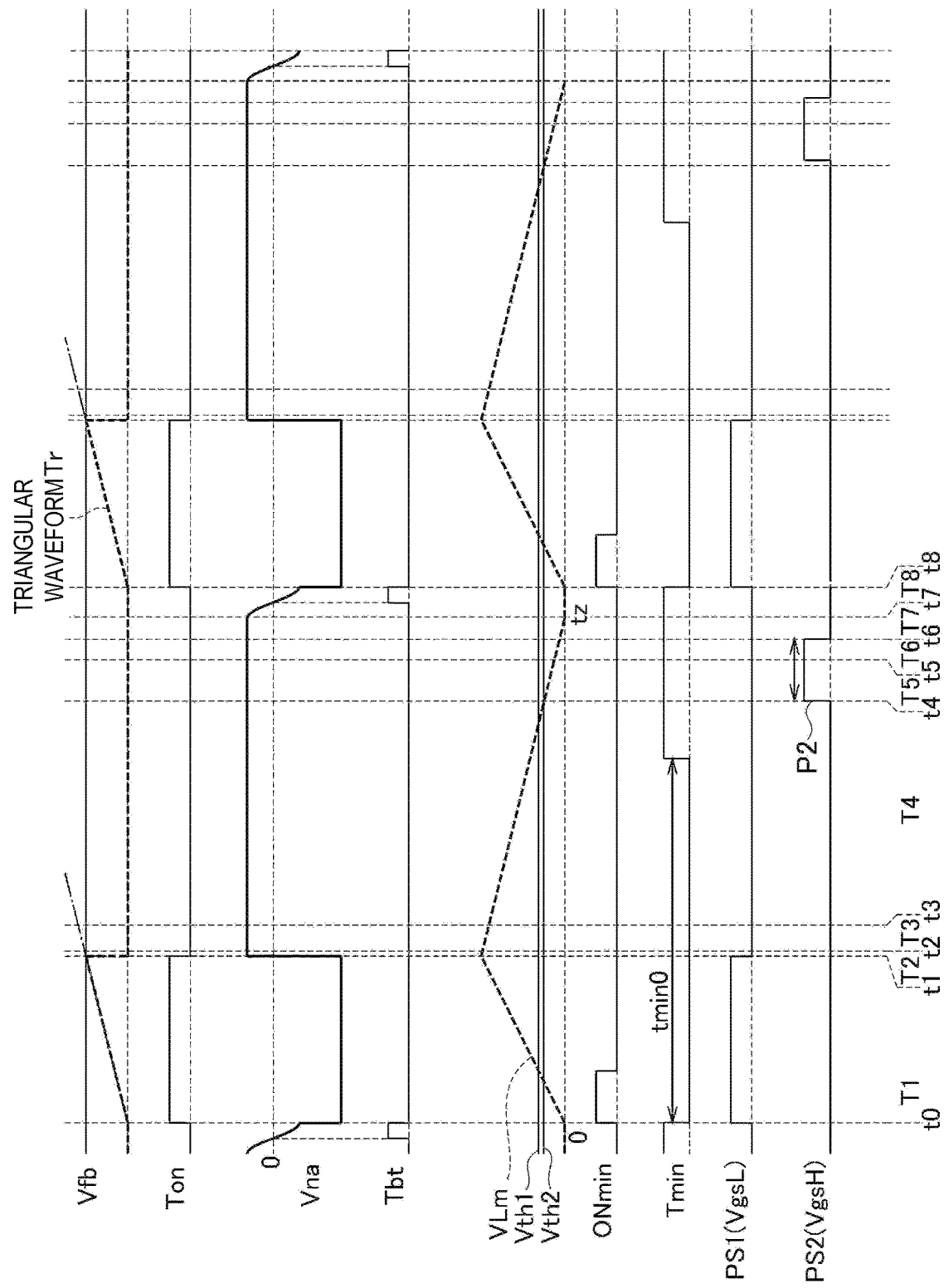
FIG. 12 is a diagram illustrating an operation waveform of a controller 2a in FIG. 11 in the first operation waveform illustrated in FIG. 3.
Figure 13:
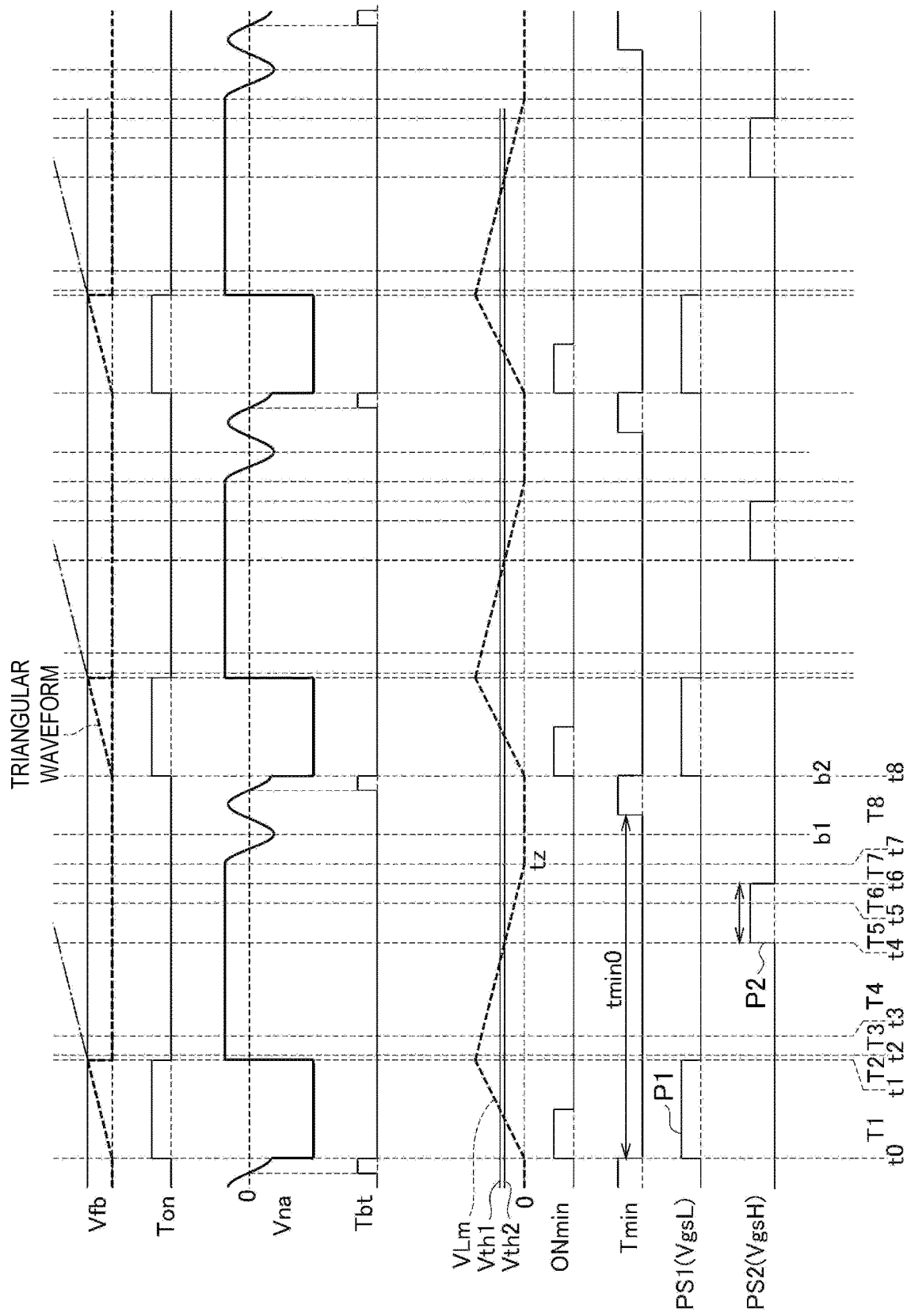
FIG. 13 is a diagram illustrating an operation waveform of the controller 2a in FIG. 11 in the second operation waveform illustrated in FIG. 6.
Figure 14:
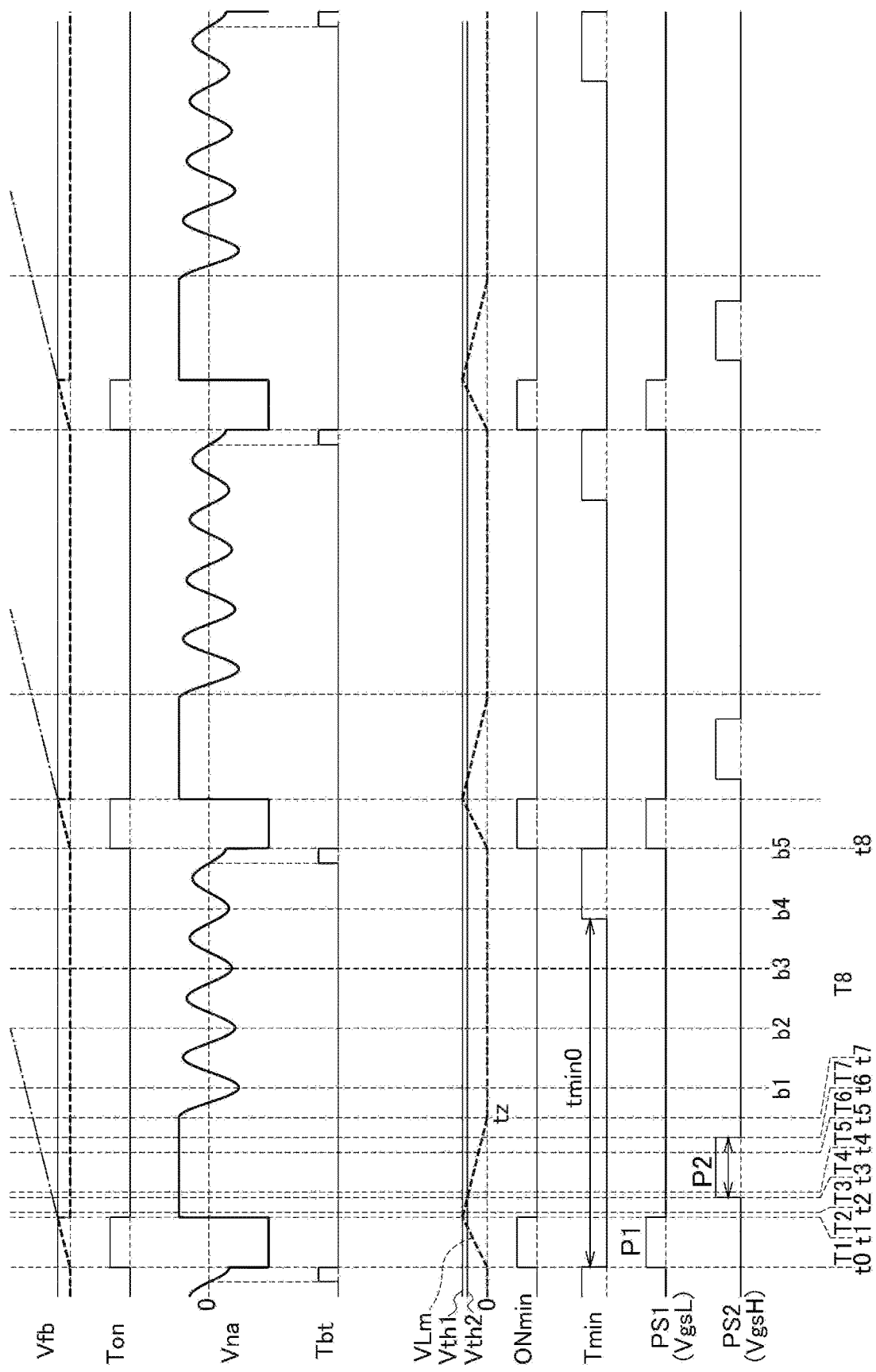
FIG. 14 is a diagram illustrating an operation waveform of the controller 2a in FIG. 11 in the third operation waveform illustrated in FIG. 7.
Figure 15:
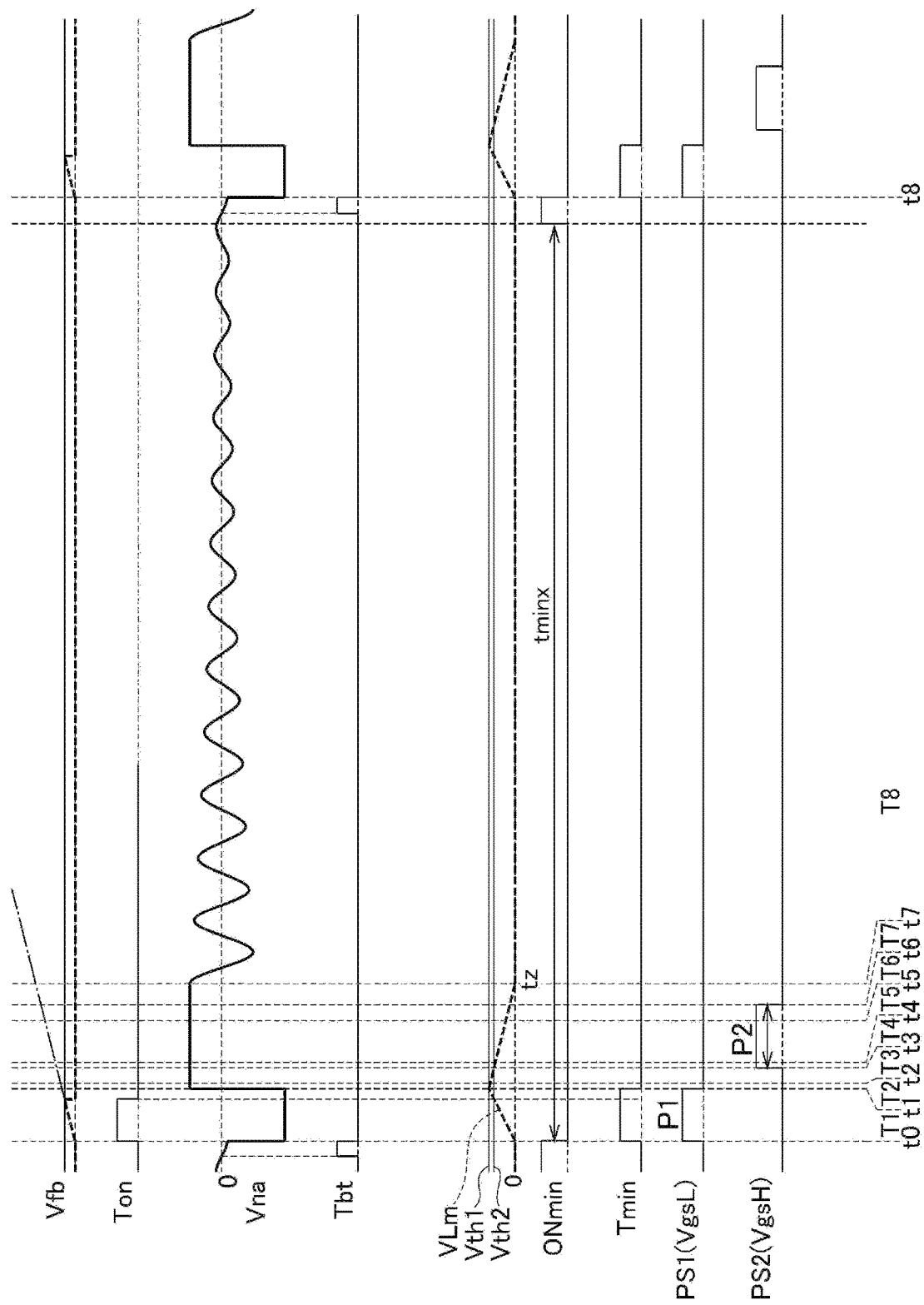
FIG. 15 is a diagram illustrating an operation waveform of the controller 2a in FIG. 11 in the fourth operation waveform illustrated in FIG. 8.

FIG. 11 is a diagram illustrating a specific example of the active clamp flyback converter (ACF) according to a first embodiment or embodiments. FIG. 12 is a diagram illustrating an operation waveform of the controller 2a of FIG. 11 in the first operation waveform illustrated in FIG. 3. FIG. 13 is a diagram illustrating an operation waveform of the controller 2a of FIG. 11 in the second operation waveform illustrated in FIG. 6. FIG. 14 is a diagram illustrating an operation waveform of the controller 2a of FIG. 11 in the third operation waveform illustrated in FIG. 7. FIG. 15 is a diagram illustrating an operation waveform of the controller 2a of FIG. 11 in the fourth operation waveform illustrated in FIG. 8.

A configuration of FIG. 11 is described in conjunction with FIGS. 12 to 15. In FIGS. 12 to 15, Vfb is an error signal output by an output voltage detector 1 and a voltage, which is obtained by amplifying a difference between a reference voltage and a detected output voltage (reference voltage−output voltage).

Ton is a signal that is generated by a Ton control based on Vfb. Vna is a voltage of an auxiliary winding Na divided by a resistor Ra1 and a resistor Ra2. Tbt is a signal detected by a bottom detector 30. VLm is a voltage detected by an excitation current detector 33. Vth1 is a voltage generated by a first threshold generator 31. Vth2 is a voltage generated by a second threshold generator 32. ONmin is a signal generated by a minimum ON time generator 22. Tmin is a signal generated by a B/S controller 21. PS1 is a signal generated by an L/S ON signal generator 23. PSP is a signal generated by an H/S ON signal generator 34. As the other signs may be the same as signs illustrated in FIG. 3, the descriptions are omitted.

In FIG. 11, an auxiliary winding Na is provided on the transformer T, and a controller 2a is different compared to the configuration illustrated in FIG. 1. The auxiliary winding Na is electromagnetically coupled to the primary winding Np and the secondary winding Ns. One end of the auxiliary winding Na is connected to one end of the resistor Ra1 and an anode of a diode Da, a cathode of the diode Da is connected to one end of a capacitor Ca, the other end of the auxiliary winding Na is connected to one end of the resistor Ra2 and the other end of the capacitor Ca, and the other end of the capacitor Ca is grounded.

The controller 2a includes a Ton controller 20, a B/S controller 21, a minimum ON time generator 22, an L/S ON signal generator 23, a first drive circuit 24, a bottom detector 30, a first threshold generator 31, a second threshold generator 32, an excitation current detector 33, an H/S ON signal generator 34, and a second drive circuit 35.

The other end of the resistor Ra1 and the other end of the resistor Ra2 detect a voltage Vna, which is a voltage of the auxiliary winding Na divided by resistance. The detected voltage Vna is output to the bottom detector 30, the first threshold generator 31, the second threshold generator 32, and the excitation current detector 33 in the controller 2a.

The Ton controller 20 generates an ON time Ton of the main switch by a triangular wave signal Tr, which is triggered by the signal Vfb detected by the output voltage detector 1 and a falling edge of a signal Tbt of the bottom detector 30, and outputs a Ton signal to the L/S ON signal generator 23 and the B/S controller 21.

As the falling edge of an output pulse detects a voltage minimum value (bottom) of the clamp switch QH, when a signal of the B/S controller 21 is H and the voltage Vna falls to zero crossing, the bottom detector 30 outputs a pulse of ¼ cycle of the inductance (Lm+Llk) of the transformer T and the resonance period Tcylm of the voltage resonance capacitor and outputs a Tbt signal to the Ton controller 20 and the minimum ON time generator 22.

The excitation current detector 33 generates the excitation voltage VLm proportional to the excitation current ILm based on the voltage Vna and outputs the excitation voltage VLm to the minimum ON time generator 22 and the H/S ON signal generator 34.

The excitation current detector 33 detects the excitation current in the excitation inductance Lm of the primary winding Np based on the following operation. As a voltage at both ends of the inductance is V and an inductance value is L, a current I flowing in the inductance increases with I=V/L×t (t is time).

The voltage Vna is a voltage proportional to the voltage at both ends of the auxiliary winding Na. Since the auxiliary winding Na is electromagnetically coupled to the primary winding Np and the secondary winding Ns, the voltage at both ends of the auxiliary winding Na is proportional to the voltage at both ends of the primary winding Np and proportional to the voltage at both ends of the excitation inductance Lm. Therefore, the voltage Vna detects the excitation voltage VLm proportional to the excitation current ILm by integrating the voltage Vna with an integrator and outputs the excitation voltage VLm to the minimum ON time generator 22 and the H/S ON signal generator.

The second threshold generator 32 outputs a second threshold Vth2 so that the second threshold Vth2 is the voltage proportional to the output voltage based on a positive voltage of the voltage Vna and an ON time t4 of an ON signal PS2 generated by the H/S ON signal generator 34 is detected 0.5Tcalk to 1.22Tcalk before the time tz when the excitation voltage VLm becomes zero, and outputs the second threshold Vth2 to the H/S ON signal generator 34.

FIG. 12 and FIG. 13 illustrate operation waveforms when Vth2 is set so that the ON time t4 of PS2 is Tcalk before a time t7(tz) when the excitation current ILm of the transformer T becomes zero. FIG. 14 and FIG. 15 illustrate operation waveforms when Vth2 is set so that the ON time t3 of PS2 is Tcalk before the time t7(tz) when the excitation current ILm of the transformer T becomes zero.

The first threshold generator 31 generates a first threshold Vth1 that is proportional to the output voltage based on the positive voltage of the voltage Vna and higher than the second threshold Vth2 so that the dead time of the ON signal PS2 generated by the H/S ON signal generator 34 and the ON signal Vgs driving the main switch QL.

Each of the first threshold generator 31 and the second threshold generator 32 may change the threshold value according to the output voltage.

The dead time is preferable to be 0.1Tcalk to 0.25Tcalk. Although, with the dead time of 0.25Tcalk or more, the normal flyback converter operation period of the period T4 in FIG. 4D is added during operations in FIG. 12, FIG. 13, and FIG. 14 and the load current value entering a burst operation is increased, there is no problem with the burst operation. Therefore, the first threshold generator 31 may generate Vth1, which is a voltage higher than Vth2, to the extent that the dead time may be ensured.

In FIGS. 12 to 15, the waveforms are set with Vth2 so that the dead time is 0.25Tcalk.

With the falling edge of the signal Tbt detected by the bottom detector 30 as a trigger, the minimum ON time generator 22 detects the time until the excitation voltage VLm reaches the first threshold Vth1 at a positive slope of the excitation voltage VLm detected by the excitation current detector 33, and outputs an ONmin signal to the L/S ON signal generator 23 and the B/S controller 21.

The B/S controller 21 compares the Ton signal of the Ton controller 20 with the ONmin signal of the minimum ON time generator 22. When the Ton signal is greater than the ONmin signal, the B/S controller 21 outputs a preset first time width (tmin0). When the Ton signal is smaller than the ONmin signal, the B/S controller 21 outputs a signal (tminx) that is the preset first time width (tmin0) or more and a preset second time width (tmax0) to the L/S ON signal generator 23 and the bottom detector 30 with the difference between the Ton signal of the Ton controller 20 and the ONmin signal of the minimum ON time generator 22.

Based on the Ton signal of the Ton controller 20, the ONmin signal of the minimum ON time generator 22, and the Tmin signal of the B/S controller 21, the L/S ON signal generator 23 outputs the Ton signal as a PS1 signal to the first drive circuit 24 when the Tmin signal is shorter than tmax0 and the Ton signal is longer than the ONmin signal. The L/S ON signal generator 23 outputs the Tmin signal as the PS1 signal to the first drive circuit 24 when the Tmin signal is shorter than tmax0 and the Ton signal is shorter than the ONmin signal. When the Tmin signal is tmax0 or longer, the PS1 signal is not output.

The first drive circuit 24 outputs the PS1 signal of the L/S ON signal generator 23 to the main switch QL to turn on the main switch QL. In other words, the bottom detector 30 detects a bottom of a voltage oscillation of the main switch QL after the excitation current of the excitation inductance becomes zero, and turns on the main switch QL at a minimum voltage time of the main switch QL detected by the bottom detection.

The H/S ON signal generator 34 outputs a preset pulse width to the second drive circuit 35 starting when a slope of the excitation voltage VLm detected by the excitation current detector 33 is negative and when the excitation voltage VLm matches the second threshold Vth2 of the second threshold generator 32. In other words, the second ON signal PS2 is output to the second drive circuit 35 as the ON timing signal of the second ON signal PS2 when the excitation voltage VLm matches the second threshold Vth2 of the second threshold generator 32.

The preset pulse width is set to be 0.5Tcalk or more, and the OFF timing is set to be before the time tz when the excitation current ILm of the transformer T becomes zero.

Vth2 is set so that the ON time t4 of the PS2 is Tcalk before the time t7 (tz) when the excitation current ILm of the transformer T becomes zero in FIG. 12 and FIG. 13, and Vth2 is set so that the ON time t3 of the PS2 is Tcalk before the time t7 (tz) when the excitation current ILm of the transformer T becomes zero in FIG. 14 and FIG. 15. Although the pulse width may be from 0.5Tcalk to Tcalk, the FIGS. 12 to 15 illustrate operation waveforms when the pulse width is 0.75Tcalk.

The second drive circuit 35 outputs the PS2 signal of the H/S ON signal generator 34 to the clamp switch QH to turn on the clamp switch QH.

By configuring the controller 2a illustrated in FIG. 11 as described above, the active clamp flyback converter (ACF) according to a first embodiment or embodiments may be realized.

Second Embodiment or Embodiments

The active clamp flyback converter according to a first embodiment or embodiments illustrated in FIG. 1 has a problem that the recovery current of the body diode BDH of the clamp switch QH is large, which worsens the noise. The problem is described below using FIG. 22.

Figure 16:
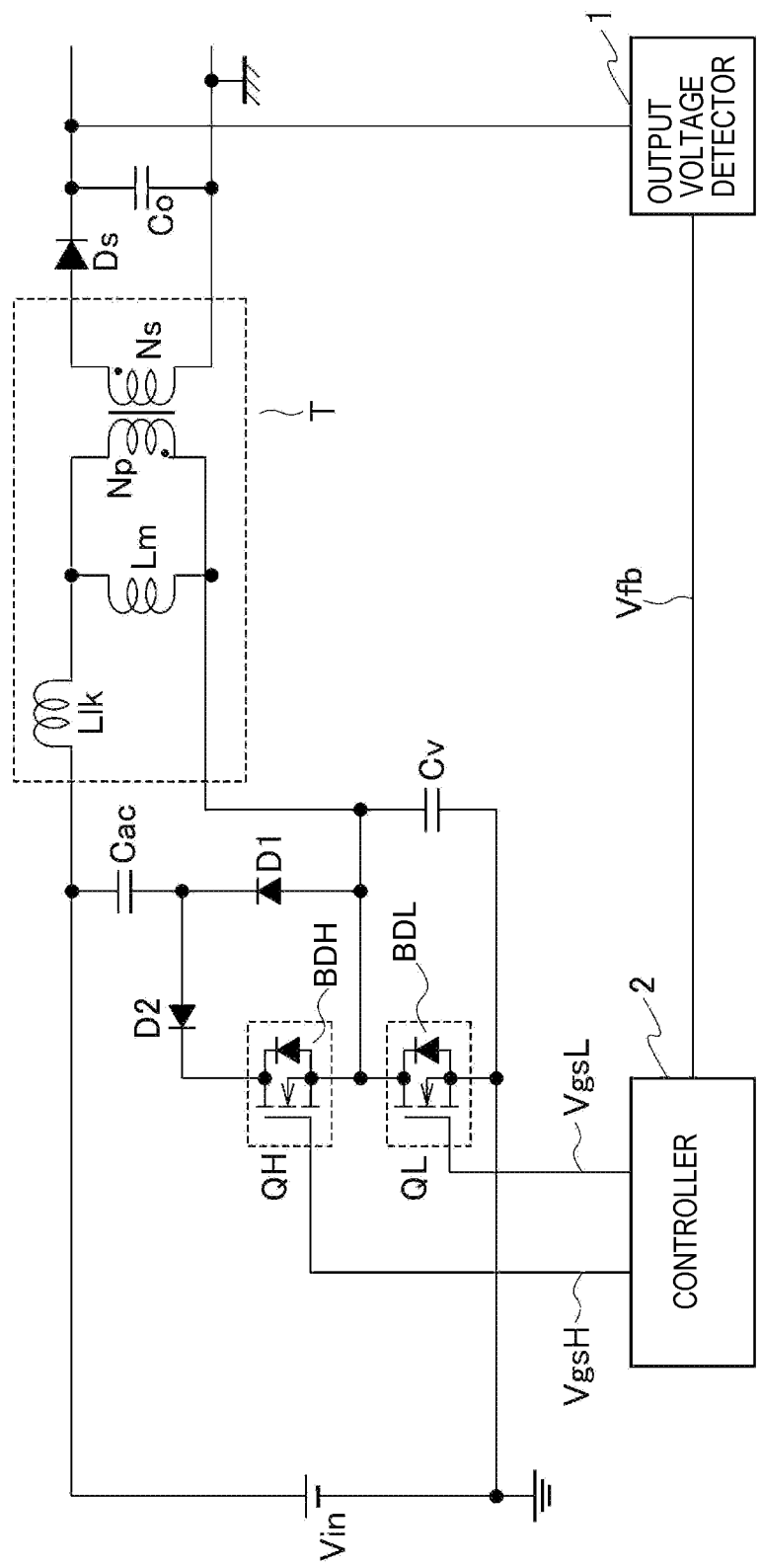
FIG. 16 is a configuration diagram illustrating an active clamp flyback converter according to a second embodiment or embodiments.

To solve the problem, an active clamp flyback converter of a second embodiment or embodiments illustrated in FIG. 16 is a configuration of the active clamp flyback converter according to a first embodiment or embodiments with an additional circuit to suppress an effect of the recovery current of the body diode BDH of the clamp switch QH.

The source of the clamp switch QH is connected to an anode of a diode D1, which is a fast diode with better recovery characteristics than the body diode BDH of the clamp switch QH. A cathode of the diode D1 is connected to one end of the clamp capacitor Cac and an anode of a diode D2. A cathode of the diode D2 is connected to the drain of the clamp switch QH.

According to the active clamp flyback converter configured as above-mentioned, the diode D2 blocks the recovery current, and the diode D1 allows the recovery current to flow at high speed. As a result, the effect of the recovery current of the body diode BDH of the clamp switch QH is suppressed.

First Variation

Figure 17:
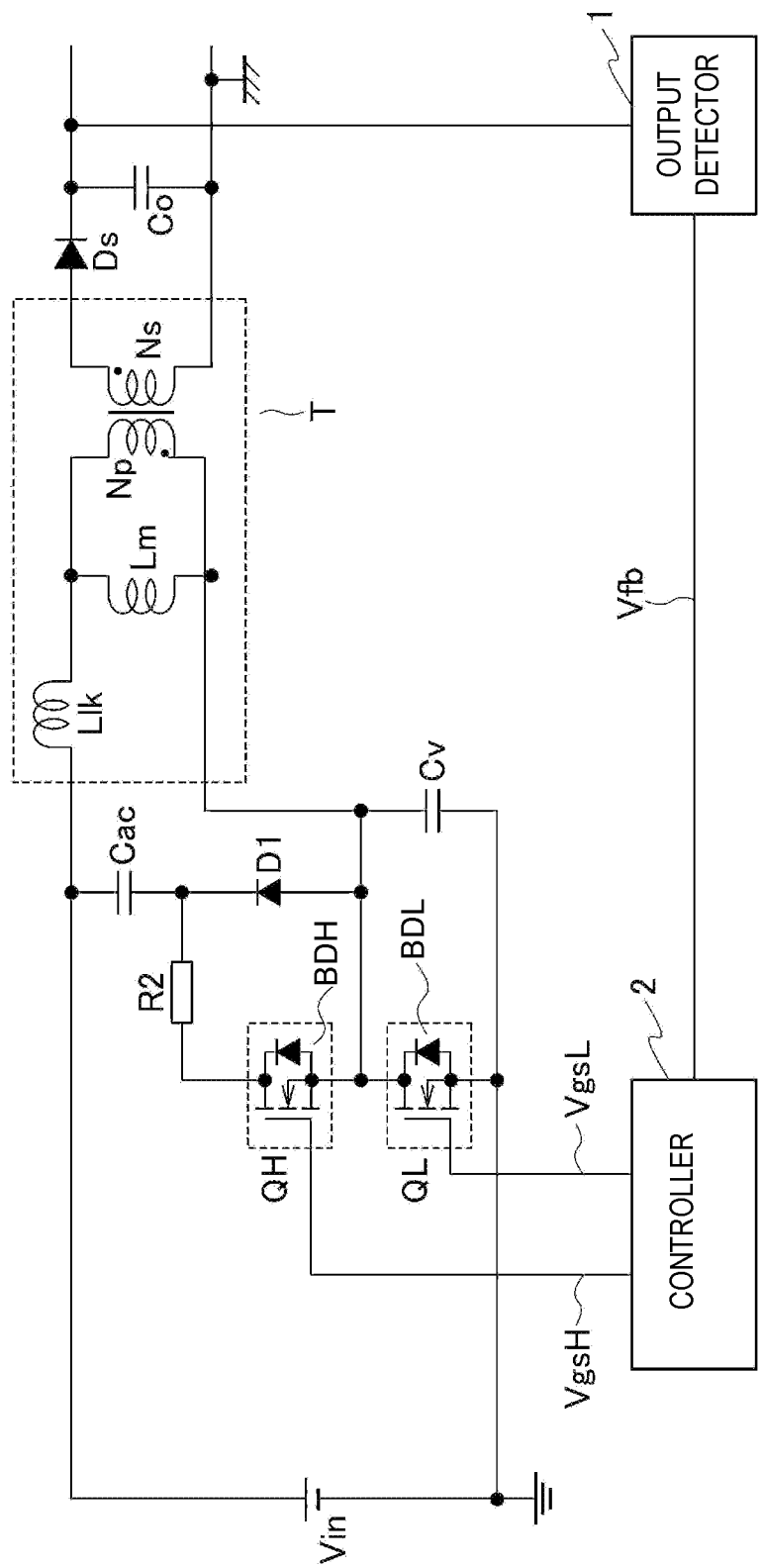
FIG. 17 is a diagram illustrating a first variation of the active clamp flyback converter according to a second embodiment or embodiments.

FIG. 17 is a diagram illustrating a first variation of the active clamp flyback converter according to a second embodiment or embodiments. The first variation of the active clamp flyback converter illustrated in FIG. 17 has a resistor R2 connected instead of the diode D2 in the active clamp flyback converter illustrated in FIG. 16.

According to the configuration, the recovery current in the body diode BDH of the clamp switch QH is reduced by flowing through the resistor R2. By using the resistor R2, the recovery current flowing in the body diode BDH may be reduced at a low cost.

Second Variation

Figure 18:
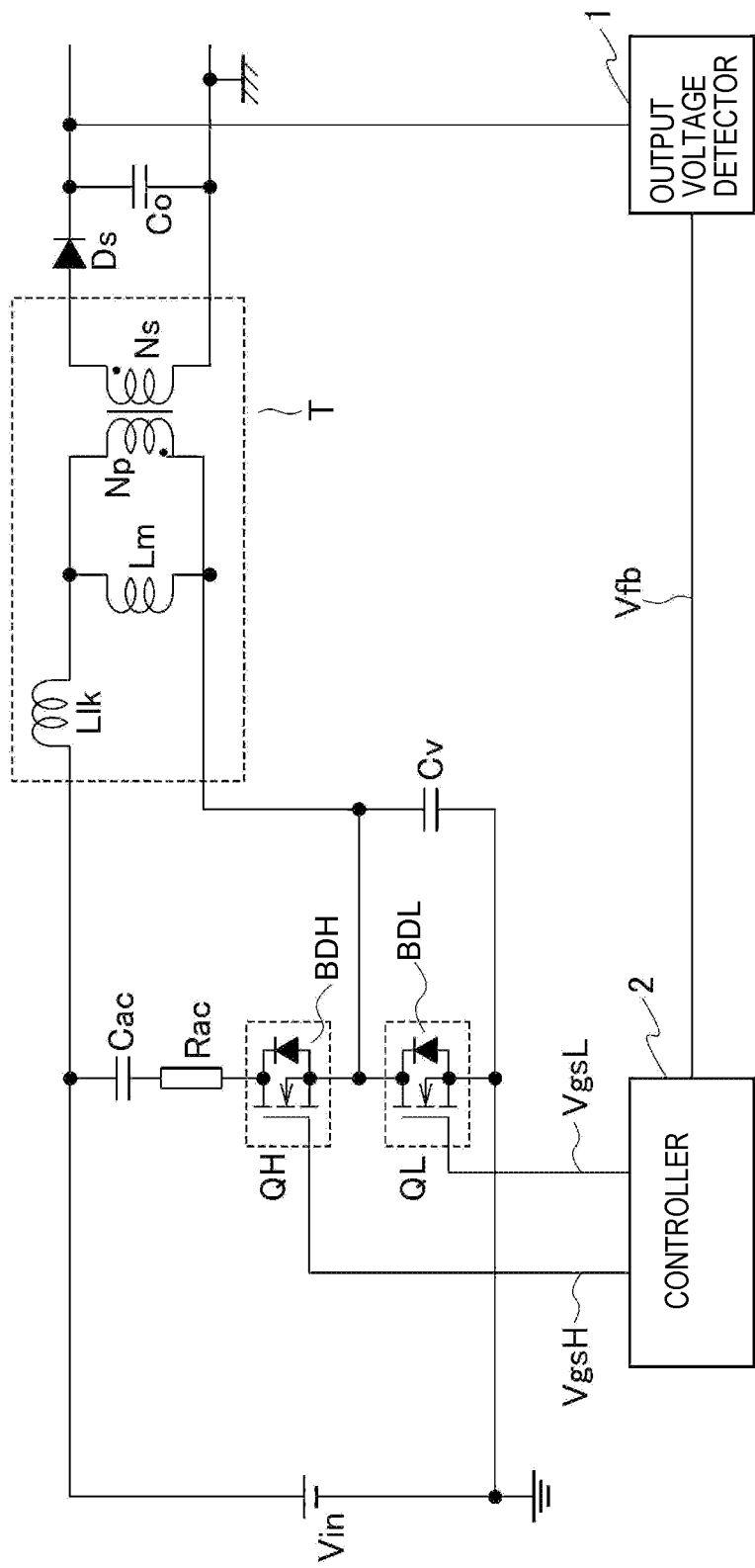
FIG. 18 is a diagram illustrating a second variation of the active clamp flyback converter according to a second embodiment or embodiments.

FIG. 18 is a diagram illustrating a second variation of the active clamp flyback converter according to a second embodiment or embodiments. The active clamp flyback converter of the second variation includes a resistor Rac connected between the drain of the clamp switch QH and the clamp capacitor Cac.

According to the configuration, the resistor Rac may suppress the recovery current flowing in the body diode BDH at a lower cost.

Third Variation

Figure 19:
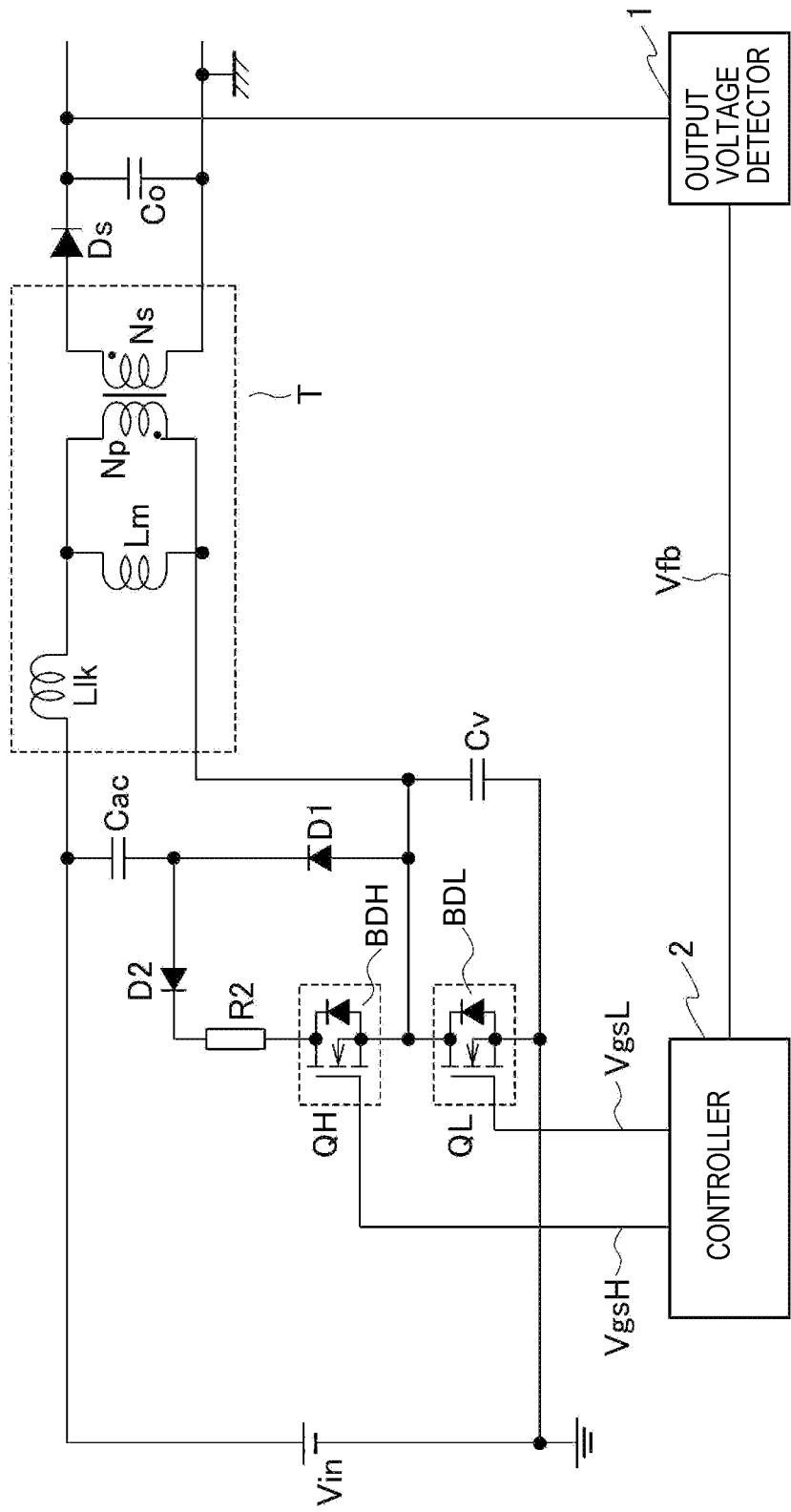
FIG. 19 is a diagram illustrating a third variation of the active clamp flyback converter according to a second embodiment or embodiments.

FIG. 19 is a diagram illustrating a third variation of the active clamp flyback converter according to a second embodiment or embodiments. The active clamp flyback converter of the third variant, with respect to the configuration illustrated in FIG. 21, furthermore has a resistor R2 connected between the cathode of the diode D2 and the drain of the clamp switch QH.

According to the configuration, even the small recovery current of the diode D2 may be suppressed by inserting the resistor R2, thereby providing a lower noise converter.

Fourth Variation

Figure 20:
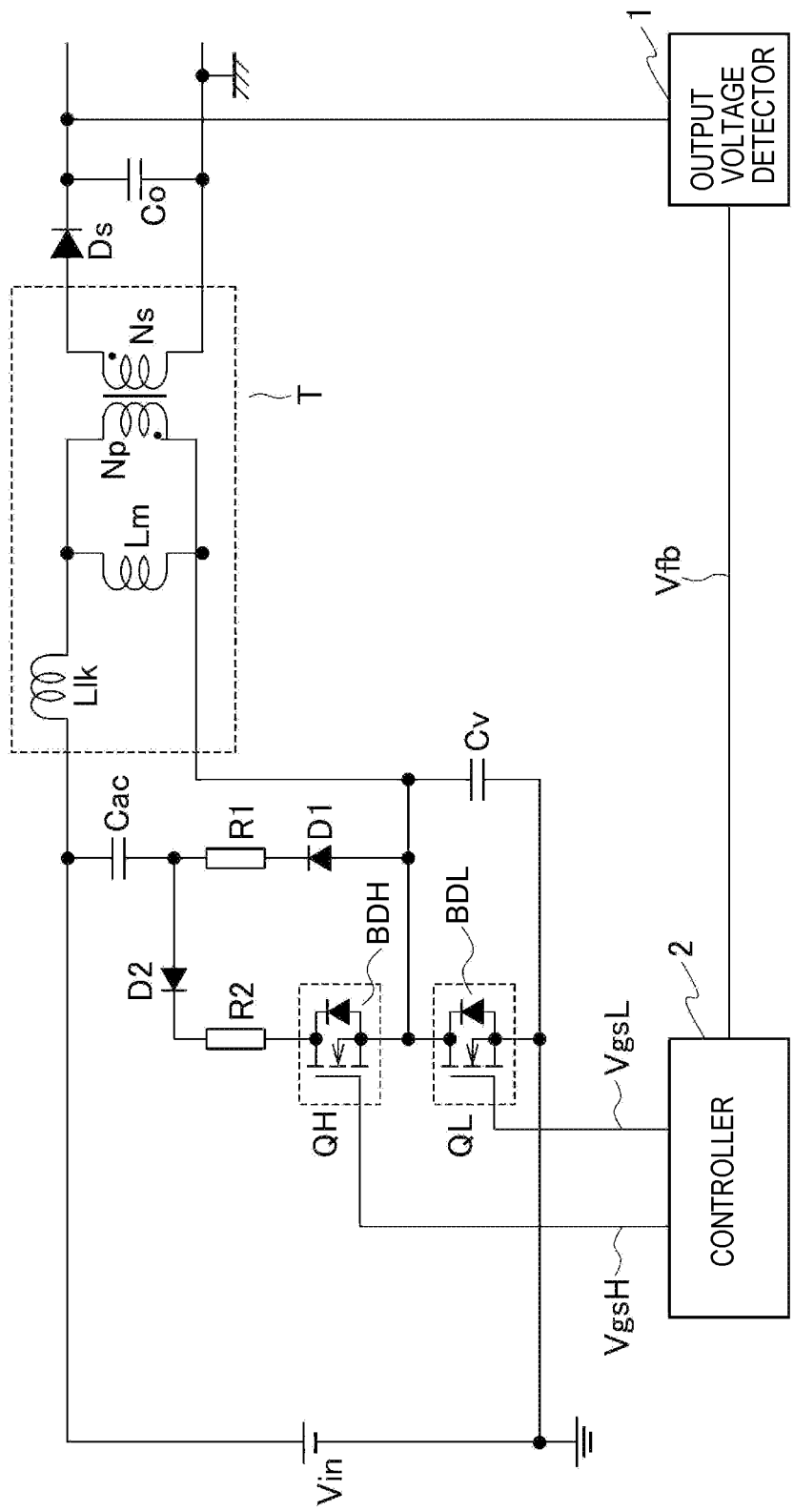
FIG. 20 is a diagram illustrating a fourth variation of the active clamp flyback converter according to a second embodiment or embodiments.

FIG. 20 is a diagram illustrating a fourth variation of the active clamp flyback converter according to a second embodiment or embodiments. FIG. 20 further connects a resistor R1 between the cathode of the diode D1 and the anode of the diode D2 to the configuration illustrated in FIG. 19.

According to the configuration, even the small recovery currents of the diode D1 and the diode D2 may be suppressed by inserting the resistor R1 and the resistor R2, thereby providing a lower noise converter.

Fifth Variation

Figure 21:
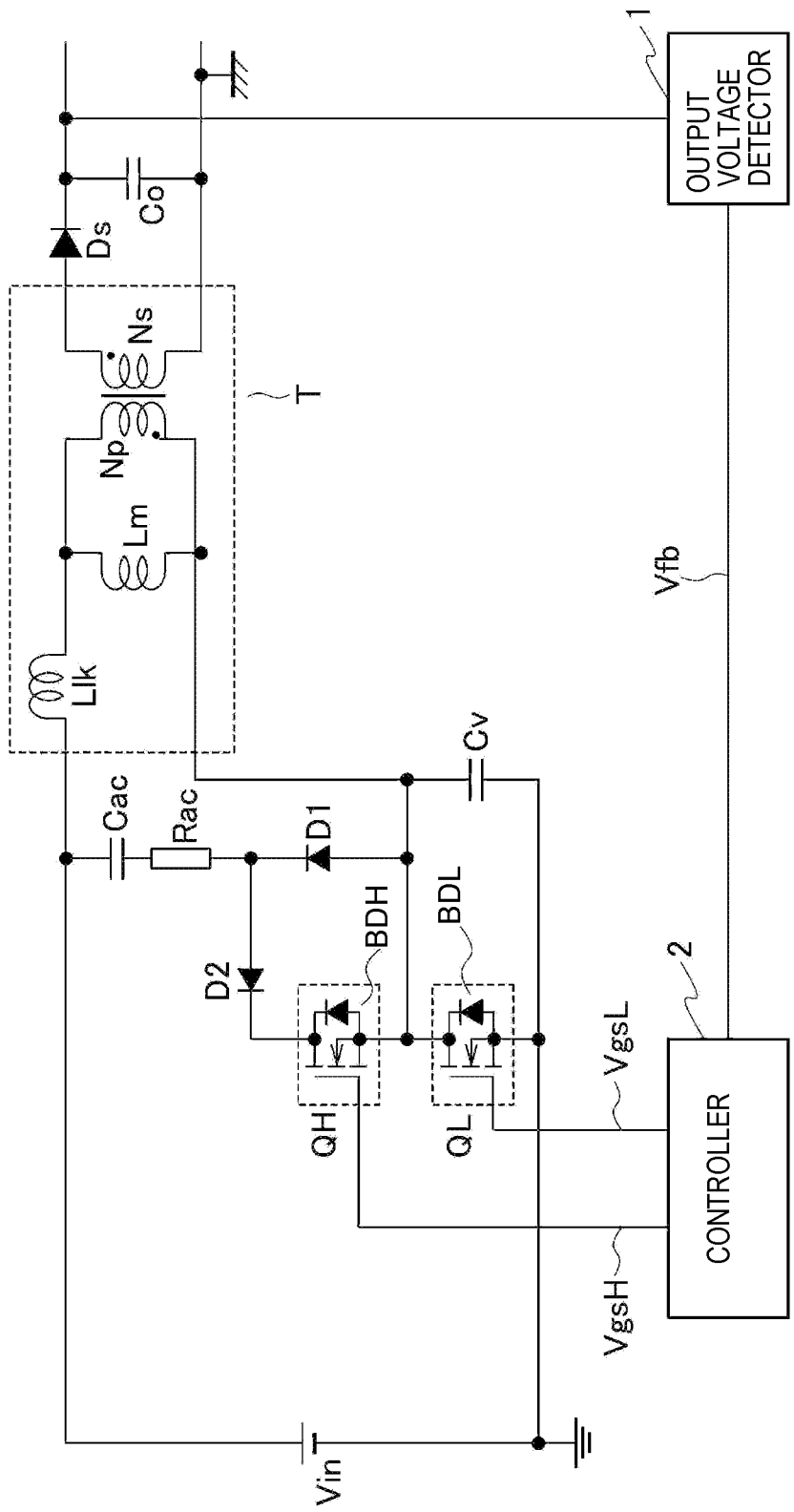
FIG. 21 is a diagram illustrating a fifth variation of the active clamp flyback converter according to a second embodiment or embodiments.

FIG. 21 is a diagram illustrating a fifth variation of the active clamp flyback converter according to a second embodiment or embodiments. The active clamp flyback converter of the fifth variation, with respect to the configuration illustrated in FIG. 16, furthermore has a resistor Rac connected between the cathode of the diode D1 and the clamp capacitor Cac.

According to the configuration, even the small recovery currents of the diode D1 and the diode D2 may be suppressed by inserting the resistor Rac, thereby providing a lower noise converter.

It may be of course possible to apply the circuit for suppressing the recovery current illustrated in FIGS. 16 to 21 to the active clamp flyback converter illustrated in FIG. 2.

FIG. 22 is an operation waveform diagram illustrating the active clamp flyback converter according to a first embodiment or embodiments when the recovery current of the body diode BDH of the clamp switch is large. FIG. 22 illustrates an operation waveform when the recovery current of the body diode BDH is large.

When the recovery current of the body diode BDH is large, a recovery current W1a flows after a current W1 becomes zero. The recovery current W1a superimposes a current W7a on a secondary side rectification current W7 through the secondary winding Ns of the transformer T and transfers energy to the leakage inductance Llk.

When the recovery current W1a reaches zero, the energy transferred to the leakage inductance Llk discharges the capacitor Cv due to the resonance operation between the leakage inductance Llk and the voltage resonance capacitor Cv, and then charges the voltage resonance capacitor Cv. The charge current causes a current W1b to flow in the leakage inductance Llk in a direction of charging the clamp capacitor Cac. The current W1b is superimposed on the secondary current, and a current W7b is superimposed on the secondary side current W7. At this time, a negative surge W10 is generated in the voltage of the main switch QL. The surge W10 is the resonance operation of the leakage inductance Llk and the voltage resonance capacitor Cv, which generates a high frequency negative surge voltage and worsens the noise.

The current W1a and the current W1b, which flow under the influence of the recovery current W1a, flow to the clamp circuit of the clamp capacitor Cac, the clamp switch QH, the transformer primary winding Np, and the leakage inductance Llk, which also causes the current W7a and the current W7b to flow for the secondary side rectification current. The current is also a cause of noise aggravation.

The active clamp flyback converter and the control IC according to one or more embodiments may allow easy and low loss synchronous rectification of the secondary side of the transformer and may reduce the core loss of the transformer.

An active clamp flyback converter according to one or more embodiments includes a first series circuit that is connected with a first parallel circuit of a main switch and a voltage resonance capacitor connected in series with a primary winding at both ends of a DC power supply, a second series circuit that is connected with a clamp switch and a clamp capacitor connected in series at both ends of the primary winding, and a transformer T that includes a secondary winding Ns electromagnetically coupled to the primary winding. The transformer T includes an excitation inductance Lm in the primary winding Np. The transformer T is configured in which a coupling coefficient between the primary winding and the secondary winding is less than 1 so that the primary winding Np includes a leakage inductance Llk. A third series circuit that is connected with a rectifier (diode) Ds and an output capacitor Co connected in series at both ends of the secondary winding Ns.

The active clamp flyback converter includes a controller 2 that turns the main switch QL on and off and turns the clamp switch QH on and off during a period when the main switch QL is off. With a time when the main switch QH is off and the excitation current of the transformer T is reduced to be zero as a time tz and a resonance period between the clamp capacitor Cac and the leakage inductance Llk as Tcalk, the controller 2 sets a turn-on time of the clamp switch QH to be 0.5×Tcalk to 1.22×Tcalk before the time tz, a turn-off time is before the time tz when the excitation current becomes zero, and an ON width to be 0.5×Tcalk or more to regenerate and output the leakage energy stored in the leakage inductance Llk of the transformer T to a secondary side, thereby the secondary side current becomes a single current waveform.

The active clamp flyback converter and the control IC according to one or more embodiments may perform a synchronous rectification of the secondary side of the transformer easily and with low loss, and may reduce a core loss of the transformer because the clamp switch is turned on and no negative excitation current flows in the transformer.

The invention claimed is:

1. An active clamp flyback converter comprising:
    a main switch;
    a primary winding that is electrically connected in series with the main switch;
    a clamp switch that is electrically connected to a connection point between the main switch and the primary winding;
    a clamp capacitor that is connected in series with the clamp switch; and
    a controller that is electrically connected to the main switch and the clamp switch and outputs a first ON signal to control the main switch and a second ON signal to control the clamp switch during a period when the main switch is off, wherein
    the controller outputs the second ON signal during a period set to after a half cycle or more of a resonance period, in which a resonance current flowing in a resonance circuit comprising the clamp capacitor and a leakage inductance, which reverses after the half cycle of the resonance period, is generated when the clamp switch is turned on, flows in a direction of charging the clamp capacitor, and is limited by an excitation current of an excitation inductance of the primary winding, such that the clamp capacitor charges and discharges only once with the resonance current.

2. The active clamp flyback converter according to claim 1, wherein
the resonance period comprises a period of charging and discharging cycle of the clamp capacitor.

3. The active clamp flyback converter according to claim 1, wherein
the controller sets an ON timing of the second ON signal to be ½ to 1.22 times the resonance period before a time when the excitation current becomes zero, an OFF timing to be before the time when the excitation current becomes zero, and an ON period of the second ON signal to be ½ or more of a resonance period of the clamp capacitor and a leakage inductance of the primary winding.

4. The active clamp flyback converter according to claim 1, wherein
the controller comprises a bottom detector that detects a bottom of a voltage oscillation of the main switch after the excitation current of the excitation inductance becomes zero, and
the main switch is turned on at a minimum voltage time of the main switch detected by the bottom detector.

5. The active clamp flyback converter according to claim 1, wherein
the controller comprises:
an excitation current detector that detects the excitation current; and
a threshold generator that generates a threshold value, wherein
the controller outputs the second ON signal as an ON timing of the second ON signal when the excitation current detected by the excitation current detector reaches the threshold value generated by the threshold generator.

6. The active clamp flyback converter according to claim 5, wherein
the threshold generator changes the threshold value according to an output voltage of the active clamp flyback converter.

7. The active clamp flyback converter according to claim 1, wherein
the controller comprises:
an excitation current detector that detects the excitation current; and
a threshold generator that generates a threshold value, wherein
the second ON signal is sent out as an ON timing of the second ON signal when the excitation current detected by the excitation current detector reaches the threshold value generated by the threshold generator.

8. A control IC comprising an active clamp flyback converter comprising:

a main switch;
a primary winding that is electrically connected in series with the main switch;
a clamp switch that is electrically connected to a connection point between the main switch and the primary winding;
a clamp capacitor that is connected in series with the clamp switch; and
a controller that is electrically connected to the main switch and the clamp switch and outputs a first ON signal to control the main switch and a second ON signal to control the clamp switch during a period when the main switch is off, wherein
the controller outputs the second ON signal during a period set to after a half cycle or more of a resonance period, in which a resonance current flowing in a resonance circuit comprising the clamp capacitor and a leakage inductance, which reverses after the half cycle of the resonance period, is generated when the clamp switch is turned on, flows in a direction of charging the clamp capacitor, and is limited by an excitation current of an excitation inductance of the primary winding, such that the clamp capacitor charges and discharges only once with the resonance current.

9. The control IC according to claim 8, wherein
the resonance period comprises a period of charging and discharging cycle of the clamp capacitor.

10. The control IC according to claim 8, wherein
the controller sets an ON timing of the second ON signal to be ½ to 1.22 times the resonance period before a time when the excitation current becomes zero, an OFF timing to be before the time when the excitation current becomes zero, and an ON period of the second ON signal to be ½ or more of a resonance period of the clamp capacitor and a leakage inductance of the primary winding.

11. The control IC according to claim 8, wherein
the controller comprises a bottom detector that detects a bottom of a voltage oscillation of the main switch after the excitation current of the excitation inductance becomes zero, and
the main switch is turned on at a minimum voltage time of the main switch detected by the bottom detector.

12. The control IC according to claim 8, wherein
the controller comprises:
an excitation current detector that detects the excitation current; and
a threshold generator that generates a threshold value, wherein
the second ON signal is sent out as an ON timing of the second ON signal when the excitation current detected by the excitation current detector reaches the threshold value generated by the threshold generator.

13. The control IC according to claim 12, wherein
the threshold generator changes the threshold value according to an output voltage.

* * * * *